United States Patent
Lu et al.

(10) Patent No.: US 7,616,084 B2
(45) Date of Patent: Nov. 10, 2009

(54) VARIABLE RELUCTANCE FAST POSITIONING SYSTEM AND METHODS

(75) Inventors: Xiaodong Lu, Cambridge, MA (US); David L. Trumper, Plaistow, NH (US)

(73) Assignee: Massachusetts Institute of Technology, Cambridge, MA (US)

(*) Notice: Subject to any disclaimer, the term of this patent is extended or adjusted under 35 U.S.C. 154(b) by 263 days.

(21) Appl. No.: 10/977,122

(22) Filed: Oct. 29, 2004

(65) Prior Publication Data

US 2005/0223858 A1    Oct. 13, 2005

Related U.S. Application Data

(60) Provisional application No. 60/619,183, filed on Oct. 15, 2004, provisional application No. 60/517,216, filed on Oct. 31, 2003.

(51) Int. Cl.
*H01F 7/00* (2006.01)
*H01F 7/20* (2006.01)

(52) U.S. Cl. .............................. 335/229; 335/285; 269/8

(58) Field of Classification Search ......... 335/220–229, 335/285–289; 269/8
See application file for complete search history.

(56) References Cited

U.S. PATENT DOCUMENTS

| | | | |
|---|---|---|---|
| 4,373,404 A | 2/1983 | Heinz | 74/424.8 B |
| 4,428,704 A | 1/1984 | Kalokhe | 408/156 |
| 4,528,533 A | 7/1985 | Montagu | 335/230 |
| 4,590,828 A | 5/1986 | Sullivan | 82/24 R |
| 4,624,169 A * | 11/1986 | Nelson | 83/881 |
| 4,634,191 A | 1/1987 | Studer | 310/90.5 |
| 4,797,039 A | 1/1989 | Bosek | 407/87 |
| 4,813,829 A | 3/1989 | Koppelmann | 409/136 |
| 4,878,787 A | 11/1989 | Hunt | 408/181 |

(Continued)

FOREIGN PATENT DOCUMENTS

DE    41 13 667    4/1991

(Continued)

OTHER PUBLICATIONS

Davidson, P., et al., "A New Symmetric Scanning Tunneling Microscope Design," J. Vac. Sci, Technol. A 6(2), Mar./Apr. 1988 p. 380-382.

(Continued)

*Primary Examiner*—Elvin G Enad
*Assistant Examiner*—Bernard Rojas
(74) *Attorney, Agent, or Firm*—Sheehan, Phinney, Bass & Green P.A.; Peter A. Nieves

(57) ABSTRACT

The preferred embodiments of the present invention are directed to high bandwidth positioning systems such as fast tool servos (FTS). The applications of this invention include, for example, diamond turning of mold with structured surface for mass production of films for brightness enhancement and controlled reflectivity, diamond turning of molds for contact lens and micro-optical positioning devices.

Preferred embodiments of the fast tool servo can have a closed-loop bandwidth of approximately 20±5 kHz, with acceleration of up to approximately 1000 G or more. The resolution or position error is approximately 1 nm root mean square (RMS). In a preferred embodiment, the full stroke of 50 μm can be achieved up to 1 kHz operation.

9 Claims, 40 Drawing Sheets

U.S. PATENT DOCUMENTS

| | | | |
|---|---|---|---|
| 4,987,526 A | 1/1991 | Slocum et al. | 364/167.01 |
| 5,196,745 A | 3/1993 | Trumper | 310/12 |
| 5,294,854 A | 3/1994 | Trumper | 310/90.5 |
| 5,417,130 A | 5/1995 | Dorsch | 82/1.11 |
| 5,467,675 A | 11/1995 | Dow et al. | 82/1.11 |
| 5,494,255 A * | 2/1996 | Pearson et al. | 251/129.15 |
| 5,625,267 A | 4/1997 | Gregory | 318/625 |
| 5,631,618 A | 5/1997 | Trumper et al. | 335/299 |
| 5,647,321 A | 7/1997 | Ichikawa et al. | 123/399 |
| 5,699,621 A | 12/1997 | Trumper et al. | 33/1 M |
| 5,718,154 A | 2/1998 | Council, Jr. | 82/1.11 |
| 5,719,543 A | 2/1998 | Berling | 335/229 |
| 5,808,384 A | 9/1998 | Tabat et al. | 310/40 |
| 5,823,720 A | 10/1998 | Moore | 408/204 |
| 5,825,112 A | 10/1998 | Lipo et al. | 310/181 |
| 5,909,069 A | 6/1999 | Allen et al. | 310/40 |
| 6,037,851 A * | 3/2000 | Gramann et al. | 335/228 |
| 6,062,778 A | 5/2000 | Szuba et al. | 408/156 |
| 6,170,367 B1 | 1/2001 | Keller et al. | 82/1.11 |
| 6,237,452 B1 | 5/2001 | Ludwick et al. | 82/1.11 |
| 6,269,784 B1 * | 8/2001 | Newton | 123/90.11 |
| 6,323,483 B1 | 11/2001 | Cleveland et al. | 250/306 |
| 6,341,548 B1 * | 1/2002 | Hirahata et al. | 83/881 |
| 6,356,391 B1 | 3/2002 | Gardiner et al. | 359/628 |
| 6,457,379 B1 | 10/2002 | Mirone | 74/552 |
| 6,523,443 B1 | 2/2003 | Hof et al. | 82/1.4 |
| 6,720,707 B2 * | 4/2004 | Tamai et al. | 310/323.12 |
| 6,845,762 B2 * | 1/2005 | Modien | 123/568.21 |
| 7,021,603 B2 | 4/2006 | Wygnaski | |
| 2002/0036748 A1 | 3/2002 | Chapoy et al. | 351/160 R |
| 2002/0057497 A1 | 5/2002 | Gardiner et al. | 359/625 |
| 2002/0057564 A1 | 5/2002 | Campbell et al. | 362/31 |
| 2002/0153982 A1 * | 10/2002 | Jones et al. | 335/220 |
| 2005/0056125 A1 | 3/2005 | Trumper | |
| 2005/0056800 A1 * | 3/2005 | Modien | 251/64 |
| 2005/0093662 A1 * | 5/2005 | Hoffman | 335/220 |
| 2005/0223858 A1 | 10/2005 | Lu et al. | |
| 2006/0087393 A1 * | 4/2006 | Dahlgren et al. | 336/5 |

FOREIGN PATENT DOCUMENTS

| | | |
|---|---|---|
| EP | 0 354 639 | 2/1990 |
| EP | 0 439 425 | 4/1993 |
| EP | 0 786 309 | 7/1997 |
| JP | 11-309646 | 4/1998 |
| SU | 914188 | 5/1980 |
| SU | 984794 | 7/1980 |
| WO | WO 03/101666 | 12/2003 |

OTHER PUBLICATIONS

Goto, T., et al., "Development of a Rotary Fast Tool Servo for Ultraprecision Grinding of Silicon Wafer," Proc. Of $2^{nd}$ euspen International Conference, Turin, Italy, May 27-31, 2001, p. 790-793.

Gutierrez, H., et al., "Fabrication of Non-Rotationally symmetric Surfaces Using a Magnetically Levitated Fast-Tool Servo," http://airy.pec.ncsu.edu/PEC/publications/annual_reports/acutation/199/97gutierrez.html, Abstract only, Oct. 21, 2002.

Hameyer, K. & Nienhaus M., "Electromagnetic Actuators—Current Developments and Examples," Paper Presented at the $8^{th}$ International Conference on New Actuators—Actuator 2002, Bremen, Germany (Jun. 2002).

Kaji, S., et al., "Ultraprecision Grinding of Large Silicon Wafer Using a Rotary Fast Tool Servo," Proc. Of $2^{nd}$ euspen International Conference, Turin, Italy, May 27-31, 2001 p. 802-805.

Ludwick, S., "Design of a Rotary Fast Tool Servo for Ophthalmic Lens Production," http://www.me.gatech.edu/me/events/seminars/Ludwick.html, Abstract only, Oct. 21, 2002.

Ludwick, S. J. et al., "Calibration and Control of a Rotary Fast Tool Servo," Proceedings of ASPE Fourteenth Annual Conference, Oct. 1999.

McKinney, M., "The Many Facets of Diamond Turning," Laser Focus World, Oct. 2001.

"Machining a Biconic Mirror," http://airy.pec.ncsu.edu/PEC/research/projects/biconic/index.html, Abstract only, Oct. 21, 2002.

Popham, V.W., et al., "Variable Gap-Reluctance Linear Motor With Application to Linear Resonance Compressors," ASME, New York, Nov. 11-16, 2001.

"Rotary Fast-Tool Servo for Diamond Turning of Asymmetric Optics," http://web.mit.edu/pmc/www/Newprojects/FastTool/fast-tool.html, Oct. 21, 2002.

Rivin, E.I., "Properties and Prospective Applications of Ultra Thin Layered Rubber-Metal Laminates for Limited Travel Bearings," Tribology Int. 1983, vol. 18, No. 1.

Okazaki, Y., "A Micro-Positioning Tool Post Using a Piezoelectric Actuator for Diamond Turning Machines," *Precision Engineering.* 1990, vol. 12, Issue 3, pp. 151-156.

Dow, T. et al., "Application of a Fast Tool Servo for Diamond Turning of Nonrotationally Symmetric Surfaces," *Precision Engineering.* 1991, vol. 13, Issue 4, pp. 243-250.

Patterson, S.R., "Design and Testing of a Fast Tool Servo for Diamond Turning," *Precision Engineering.* 1985, vol. 7, Issue 3, pp. 123-128.

* cited by examiner

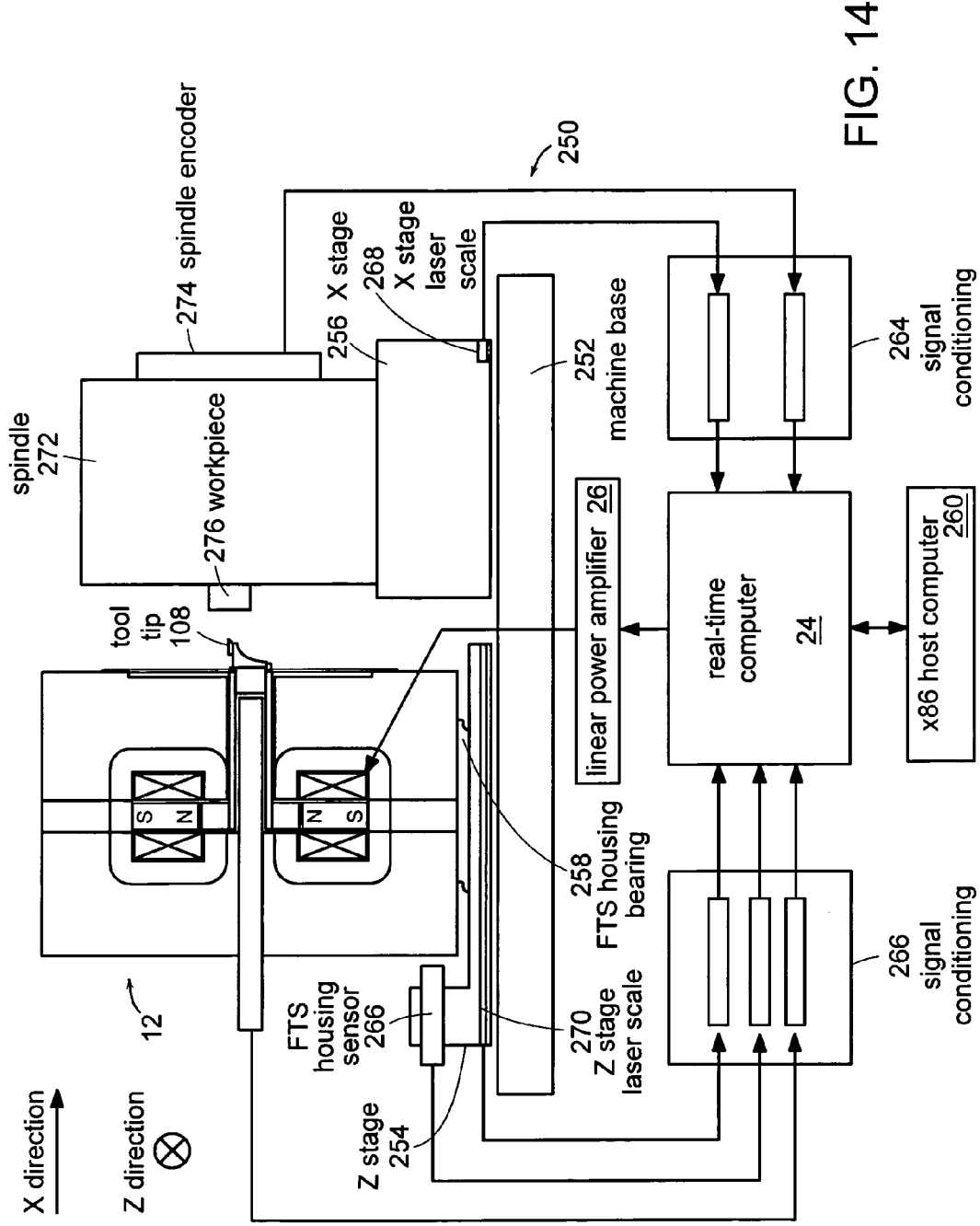

Control Performance for Tracking 5 μm Sine waves

| Frequency (HZ) | RMS Error (nm) / Relative Error | | | |
|---|---|---|---|---|
| | No AFC | 1 AFC | 2 AFCs | 3 AFCs |
| 300 | 194/5.5% | 7.3/0.21% | 2.4/0.07% | 2.2/0.06% |
| 500 | 406/11.5% | 13.6/0.38% | 3.9/0.11% | 2.7/0.07% |
| 700 | 654/18.5% | 17.0/0.5% | 6.2/0.17% | 4.5/0.13% |
| 1000 | 1048/29.6% | 21.4/0.6% | 14.8/0.42% | 7.3/0.2% |

FIG. 16D

The block diagram of the real time computer

The block diagram of the power amplifier

Power amplifier control circuit with flux feedback...

VARIABLE RELUCTANCE FAST POSITIONING SYSTEM AND METHODS

CROSS REFERENCE TO RELATED APPLICATIONS

This patent application claims the benefit of U.S. Provisional Patent Application 60/517,216, having a filing date of Oct. 31, 2003 and U.S. Provisional Patent Application 60/619,183, having a filing date of Oct. 15, 2004, these applications being incorporated herein by reference in their entirety.

STATEMENT REGARDING FEDERALLY SPONSORED RESEARCH OR DEVELOPMENT

This invention was made with government support under Grant Number DMI-0322590 from the National Science Foundation. The government has certain rights in the invention.

BACKGROUND OF THE INVENTION

Fast Tool Servo (FTS) technology can enable precise positioning or manufacturing of complicated sculptured surfaces having nanometer-scale resolution requirements. Such surfaces are used in a wide range of products, including films for brightness enhancement and controlled reflectivity, sine wave ring mirrors used in carbon dioxide ($CO_2$) laser resonators, molds for contact lenses, as well as in micro-optical devices such as Fresnel lenses, multi-focal lenses and microlens arrays. The limits on stroke, bandwidth, acceleration, and position noise of the FTS impose limits on the types, quality, and rate at which the intended surfaces can be produced. The requirements for obtaining high throughput for an FTS include high bandwidth, high acceleration, and high accuracy.

FTS actuators can be categorized as four types: piezoelectric actuators, magnetostrictive actuators, Lorentz force motors (including linear and rotary) and variable reluctance actuators. According to moving strokes, short stroke can be defined as being less than 100 μm, intermediate as being between 100 μm and 1 mm and long stroke as being above 1 mm.

Most of the high bandwidth, short stroke FTS's are based on piezoelectric actuators. Piezoelectric FTS's have the advantage that they can readily achieve bandwidths on the order of several kHz and high acceleration on the order of hundreds of G's, are capable of nanometer resolution of positioning, and can achieve high stiffness (usually greater than 50 N/μm in the typical sizes used).

However, piezoelectrically actuated FTS's also have significant disadvantages. When the piezo materials undergo deformation, heat is generated by hysteresis loss, especially in high bandwidth and high acceleration applications. In addition, it may be difficult to couple the piezoelectric material to a moving payload in such a way as to not introduce parasitic strains in the actuator. Furthermore, piezoelectric FTS's require large and expensive high-voltage, high current amplifiers to drive these devices. Still another shortcoming associated with piezoelectrically activated FTS's is that the structural resonance modes of the PZT stacks limit working frequency ranges, because operation near the internal resonances can cause local tensile failure of PZT ceramics. Piezoelectric actuators can also be used in other high-bandwidth, short-stroke applications such as electric engraving, mirror positioning and scanning and micropositioning, but have the same disadvantages.

However, electromagnetic actuators do not have such problems and thus are a promising alternative. Variable reluctance actuators in FTS's have not been developed extensively, because of the difficulty of controlling these devices in the presence of the inherent non-linearities. There still remains a need for developing an electromagnetically driven actuator as a replacement for widely used piezoelectrically actuated systems.

SUMMARY OF THE INVENTION

The preferred embodiments of the present invention are directed to high bandwidth fast positioning systems such as fast tool servos (FTS). The system includes an armature assembly having a cutting tool mounted thereon, an actuator that applies a force to a working surface of the armature and a bias actuator that delivers bias flux to a biased surface of the armature. By applying bias flux to a separate region of the armature surface, a more efficient linear response is achieved at high operating frequencies. In a preferred embodiment, the bias flux is directed through a surface that is orthogonal to the surfaces receiving the working flux. For example, a preferred embodiment directs the bias flux through the outer radial surface of a disk shaped armature, and uses permanent magnets as the bias flux excitation source.

Preferred embodiments of the invention utilize this system for both rotary and linear reciprocating positioning systems. The applications of this invention include, for example, fast tool servos for diamond turning of molds with structured surfaces for mass production of films for brightness enhancement and controlled reflectivity, diamond turning of molds for contact lens and positioning systems such as micro-optical devices, optical tracking and pointing systems using fine mirror steering, engravers for cutting printing plates, and so on.

Preferred embodiments of the fast tool servo can have a closed-loop bandwidth of approximately 20±5 kHz, with an acceleration of a cutting tool up to approximately 1000 G or more. The resolution or position error is approximately 1 nm root mean square (RMS). In a preferred embodiment, the full stroke of 50 μm can be achieved up to 3 kHz operation.

In accordance with a preferred embodiment, a servo tool device for fabricating a three-dimensional surface, includes an armature assembly having a front end and a rear end with a cutting tool provided at the front end, a shaft, such as a carbon fiber tube, and an armature actuated by a pair of solenoids. At least one flexure attaches the moving armature assembly to a frame. The flexure guides a tool tip along one degree of freedom in the axial direction of the shaft or tube. The pair of solenoids can be circular E-type solenoids in a preferred embodiment. The device further includes coil windings provided into a plurality of slots of the solenoids, and a linear power amplifier or switching amplifier to drive the coils. The device further includes a capacitance probe provided in the rear end of the device to sense the motion of the armature. The armature and solenoids are made of high frequency, soft magnetic materials, for example, ferrite, silicon steel lamination, nickel-steel, cobalt-steel, powder sintered iron and metallic glass.

In accordance with another aspect of the present invention, the device further includes a controller. The controller comprises a dynamic non-linear compensator, an adaptive-feed forward compensator and a lead-lag (frequency shaping) controller. The controller can include digital processing integrated circuits in a preferred embodiment. The controller can include a programmable computer. Position sensing can be performed with capacitance sensors, inductive sensors, optical sensors or with a glass scale.

In accordance with yet another aspect of the invention, a servo tool device for fabricating a three-dimensional surface is provided. The servo tool devices include a frame and an armature assembly moveably disposed within the frame. The armature assembly has a front end and a back end and the shaft moves along a defined axis, and has an armature attached to the back end. The servo tool device also includes a cutting tool which is mounted on the front end of the shaft so that it can engage a workpiece along the defined axis. A flexure is mounted to the frame in a manner allowing the shaft to pass therethrough. The flexure provides both axial and rotational stiffness to the shaft as it moves along the axis while the cutting tool engages a workpiece. An elastomeric material such as a rubber-pad or laminated rubber bearing provides further motion guiding for the armature assembly along the defined axis. The servo tool device may also include a controller, power amplifier, position sensor and user interface for facilitating operation on the workpiece.

The foregoing and other features and advantages of the system and method for high bandwidth variable reluctance fast tool servos will be apparent from the following more particular description of preferred embodiments of the system and method as illustrated in the accompanying drawings in which like reference characters refer to the same parts throughout the different views. The drawings are not necessarily to scale, emphasis instead being placed upon illustrating the principles of the invention.

BRIEF DESCRIPTION OF THE DRAWINGS

FIG. 14 illustrates a schematic representation of a fast tool servo based diamond turning machine;

FIG. 16D illustrates tabulated results illustrating the performance of an adaptive feed forward control algorithm;

DETAILED DESCRIPTION OF THE INVENTION

Figure 1:
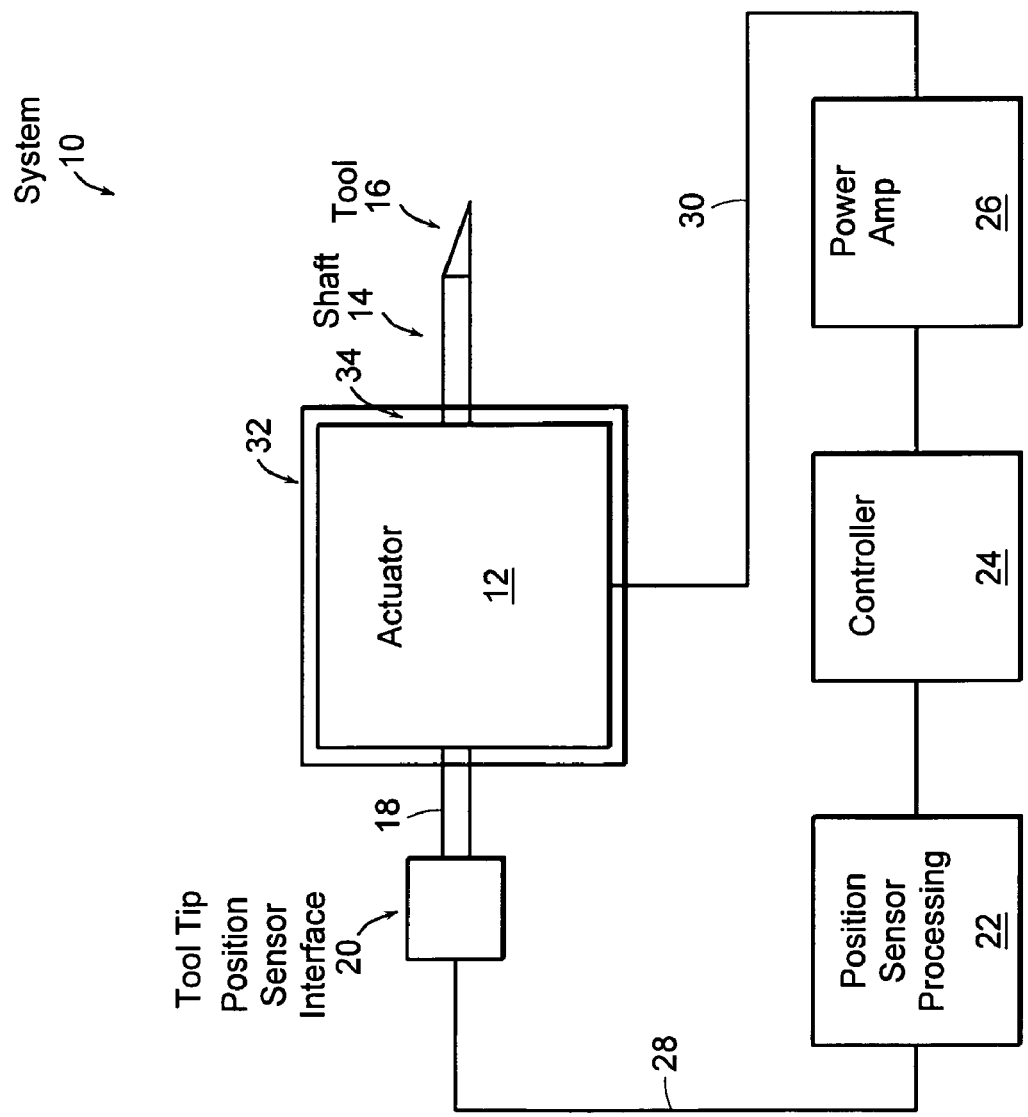
FIG. 1 illustrates a schematic representation of a fast tool servo based system in accordance with embodiments of the invention.

FIG. 1 illustrates a schematic representation of a system 10 consisting of linear fast tool servo (linear FTS) 12 having a shaft 14 and tool 16, a tool tip position sensor 18 having a position sensor interface 20 and a position sensor control and processing module 22, a controller 24 and a power amplifier 26. FTS 12 is an electromagnetic device that operates at very high speeds while allowing extremely precise control of tool tip 16. In fact, embodiments of FTS can operate at speeds on the order of 20 kHz while providing tool position accuracies on the order of 1 nanometer (nm).

Position sensor 18 is communicatively coupled to shaft 14 in a manner allowing the position of tool 16 to be monitored with respect to a reference. The reference may be a face 34 of a housing 32 surrounding components making up FTS 12, or the reference may be a gap between magnetic components, a point located external to housing 32, etc. Position sensor 18 may also include an interface 20 and control module 22 for coupling sensor 18 to controller 24.

Interface 20 may be coupled to position sensor processing module 22 using a cable 28. Cable 28 may consist of a single electrical or electromagnetic medium such as a wire or optical fiber, or it may consist of multiple wires and/or fibers. Cable 28 may carry power, data and/or control signals.

Processing module 22 is coupled to controller 24. Controller 24 may consist of a general purpose and/or application specific processor executing machine-readable instructions for controlling the operation of FTS 12. A power amplifier 26 is used to drive shaft 14 at a desired frequency and with a desired excursion or amplitude. Power amplifier 26 may be coupled to FTS 12 using one or more wires 30.

Figure 2A:
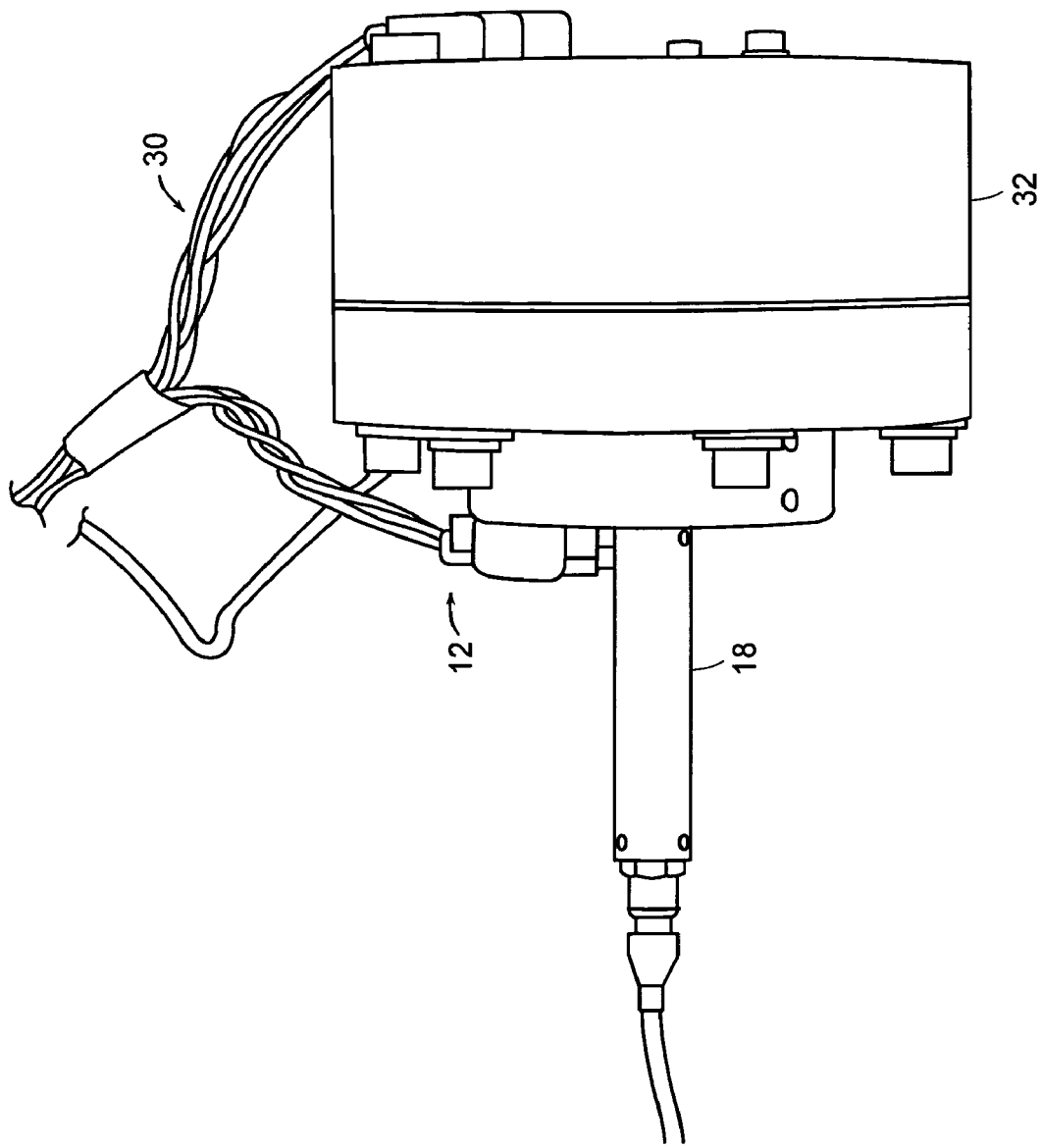
FIGS. 2A-2E illustrate various views of an embodiment of a fast tool servo in accordance with an aspect of the invention.
Figure 2B:
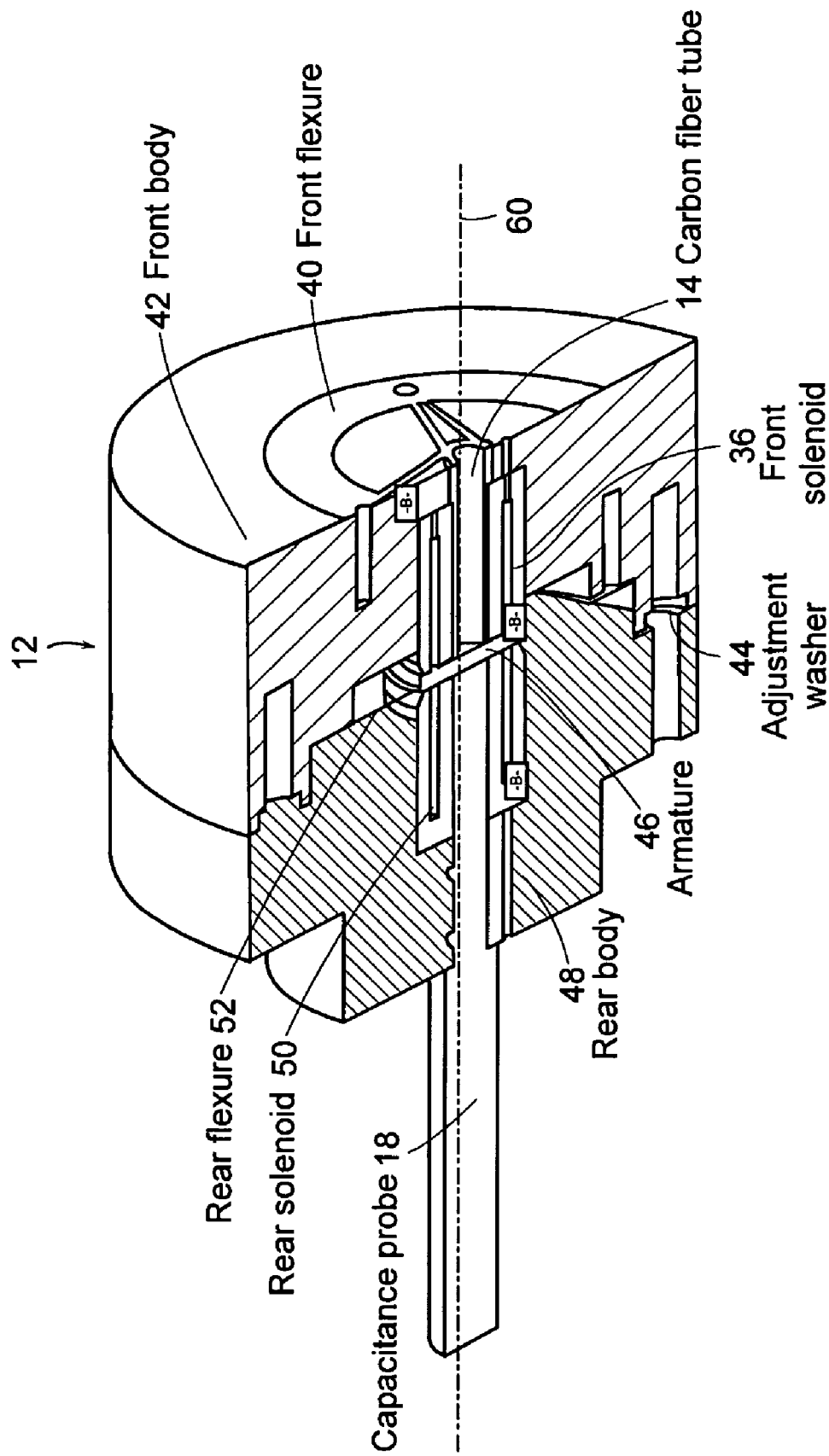
Figure 2D:
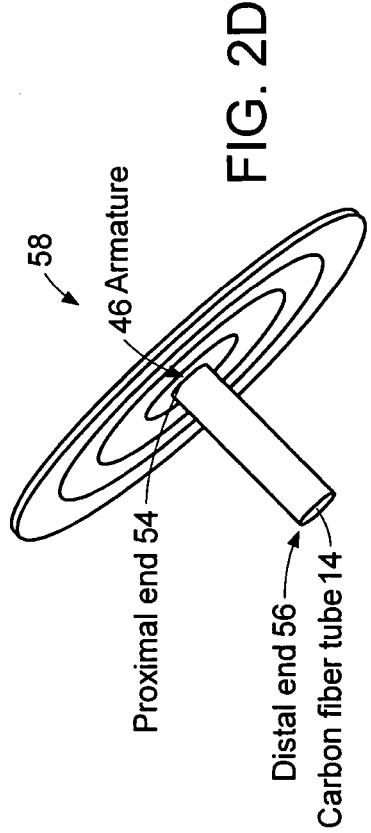

FIG. 2A illustrates an embodiment of FTS 12 showing probe 18, cables 30 and housing 32. FIG. 2B illustrates a cutaway view of the FTS 12 illustrated in FIG. 2A. FIG. 2B illustrates FTS 12 along with a front solenoid 36 (FIG. 2C), shaft 14 (here carbon fiber tube), a front flexure, or bearing 40, a front body 42, an adjustment washer 44, an armature 46, a rear body 48, a rear solenoid 50, a rear flexure 52 and position sensor 18 (here shown as a capacitance probe). Front solenoid 36 and rear solenoid 50 (FIG. 2E) provide a pushing force, displacing (extending) tool 16 away from front face 34, and a pulling force, displacing (retracting) tool 16 toward face 34. Front and rear solenoids 36, 50 apply force to armature 46 which is attached to shaft 14. FIG. 2D illustrates an embodiment of armature 46 and carbon fiber tube 14. As shown in FIG. 2D, a distal end of carbon fiber tube 14 is coupled to armature 46 and a proximal end 56 is available for mounting to a base of tool 16. Armature 46 and carbon fiber tube 14 together make a moving assembly 58 which is suspended to housing 32 using front flexure 40 and rear flexure 52. Flexures 40, 52 may be fabricated from nonmagnetic or magnetic materials such as spring steel.

Figure 2E:
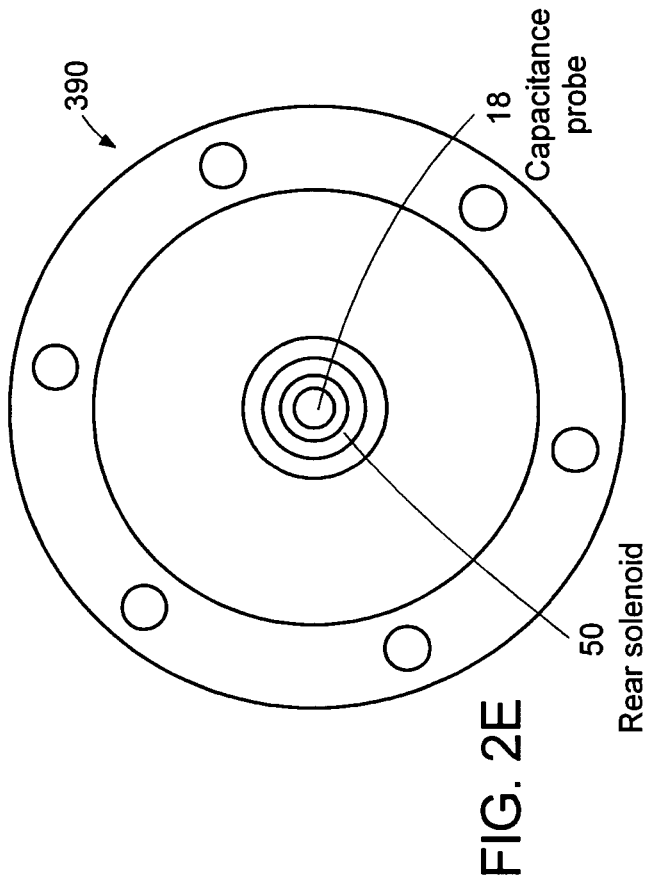
Figure 2C:
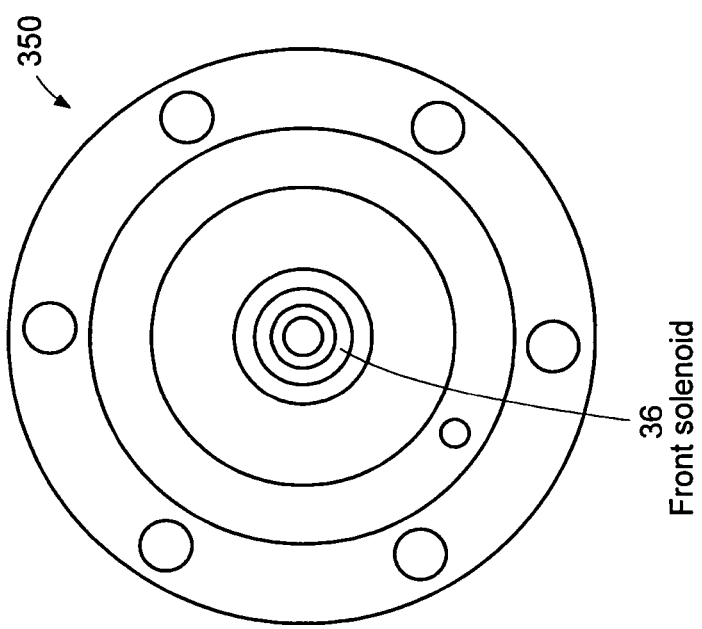

Flexures 40, 52 guide assembly 58 allowing it to move in only one direction, for example, along axis 60 (FIG. 2B). Thus flexures 40, 52 allow tool 16 to have one degree of freedom. Front solenoid 36 and rear solenoid 50 together provide a push-pull drive to assembly 58. In a preferred embodiment, circular E-type solenoids are employed having respective air gaps on the order of 100 micrometers (µm). If desired, air gaps can be reduced to improve efficiency of operation. FIG. 2C illustrates an embodiment of front solenoid 36 and FIG. 2E illustrates an embodiment of rear solenoid 50.

Figure 3:
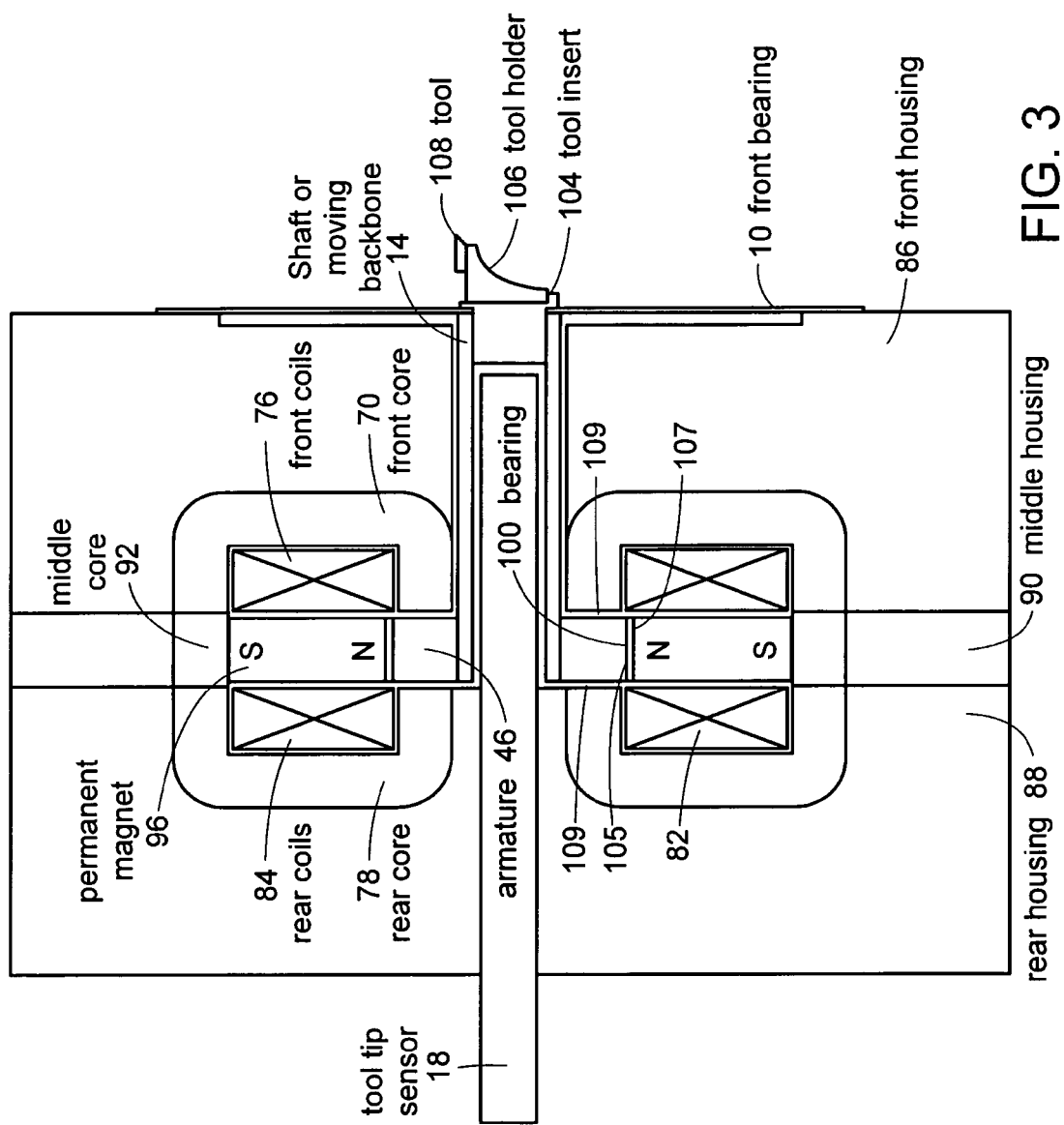
FIG. 3 illustrates a sectional view of a fast tool servo.

FIG. 3 illustrates an embodiment of front solenoid as having a first front core 70 and a front winding set 76. In addition, rear solenoid includes a rear core 78, and a rear winding set 84. Front and rear solenoids may be mounted in a front housing 86 and rear housing 88, respectively. And, a middle housing 90 may include a middle core 92, a permanent magnet 96, a middle bearing 100. Armature 46 may be slideably associated with the middle bearing 100.

Permanent magnet 96 generates a DC biasing flux which facilitates generation of a force that is linear with respect to both the air gap and excitation current. This linearity results, at least in part, from the fact that the permeability of the permanent magnets is near that of air, and therefore the DC bias flux does not change significantly with the armature position.

FIG. 3 also illustrates an alternative preferred embodiment for mounting a cutting tool to FTS 12. In particular, FIG. 3 illustrates a hollow shaft 14 having position sensor 18 passing into an open inner volume of shaft 14. At the distal end of shaft 14, a tool insert 104 is coupled to shaft 14 and to tool holder 106. Tool holder 106 is in turn releasably coupled to tool tip 108. For example, tool tip 108 may be attached to tool holder 106 using threaded fasteners or a machined recess adapted for holding tool tip 108. Bias is directed through the biasing surface 105 which corresponds to the outer radial surface of the armature 46 on which the middle bearing 100 is secured. The biasing surface faces the bias actuator surface 107 of magnet 96. The force applied to the armature 46 by magnetic front and rear cores 70 and 78 is directed through the working surface, 109 on the front and rear sides of the armature. Preferred embodiments of the invention separate the working surface 109 and the bias receiving surface 105 completely or provide at most a 10-20 percent overlap of these surfaces. In this embodiment, these two surfaces are positioned at an orthogonal angle relative to each other.

In an embodiment, front core 70 and rear core 78 have gaps approximately 2 millimeters (mm) wide and 20 mm deep into which windings consisting of 4 strands of #30 AWG self-bonding wire are wound. The use of multi-strand self-bonding wire reduces the skin-depth effect in the copper conductor at high frequencies. The mass of armature 46 and shaft 14 can be reduced in order to maximize acceleration and minimize the reaction force associated with assembly 58. Eddy currents along magnetic flux paths may be reduced by utilizing sintered soft magnetic materials made from iron particles having a diameter on the order of 100 µm.

Alternative embodiments can employ different magnetic materials suitable for high frequency applications such as, for example, but not limited to, ferrite, laminated nickel iron, silicon iron, powder sintered iron and laminated metallic glass. Desirable magnetic materials have high saturation, high resistivity, high permeability and mechanical strength.

Figure 4:
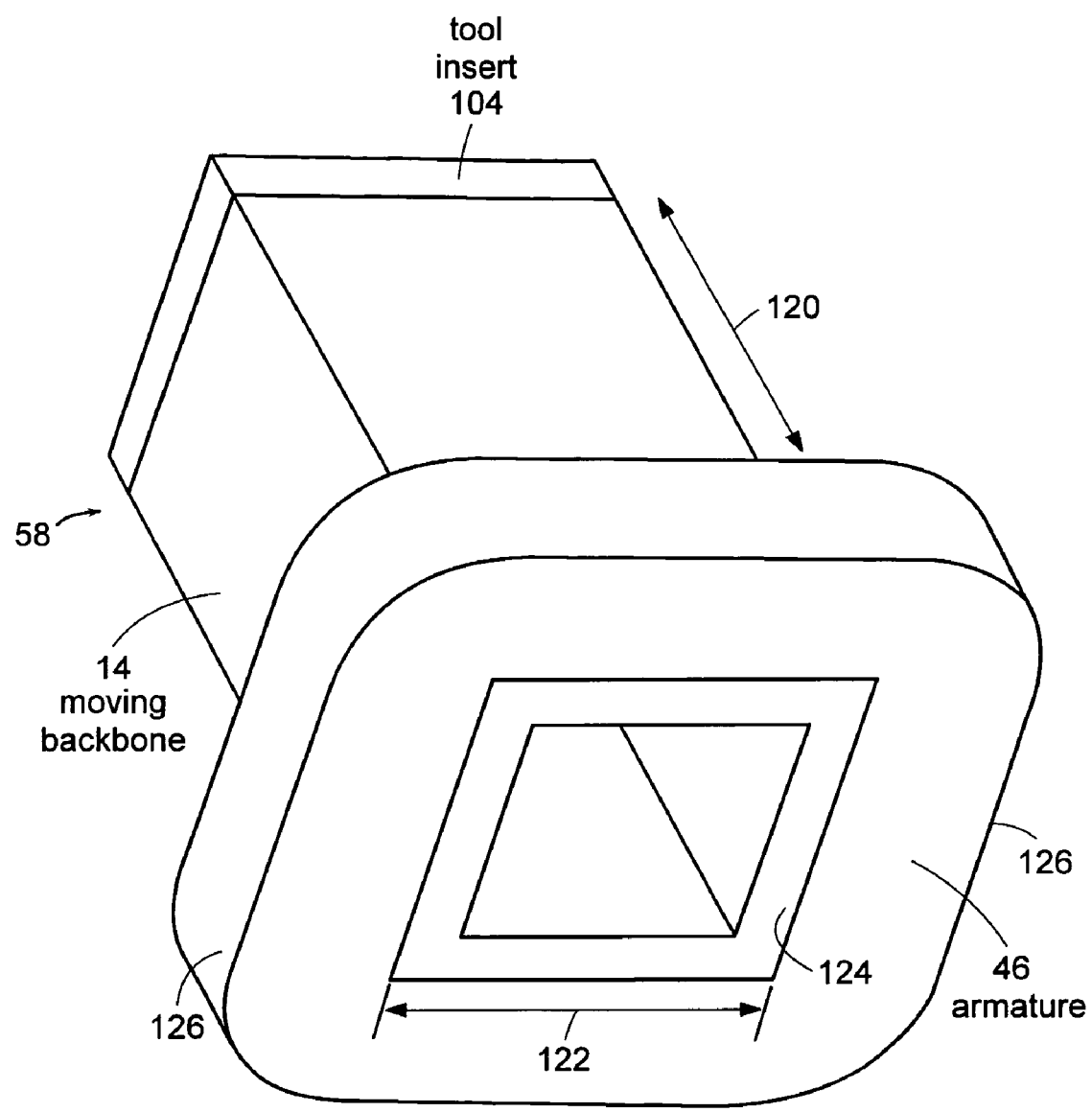
FIG. 4 illustrates an assembly of a fast tool servo including an armature, moving backbone and tool insert.

FIG. 4 illustrates an embodiment of moving assembly 58 coupled to tool insert 104. Shaft 14 is rectangular in shape along its long axis 120 and has a substantially square cross section 122. Shaft 14 is made from a material with high stiffness and low weight such as a metal matrix composite ceramic carbon fiber, aluminum oxide, silicon carbide or silicon nitride. Armature 46 has an inner surface 124 and outer surface 126. Inner surface 124 conforms to the outer dimensions of cross section 122. The sides of armature 46 making up outer surface 126 may take on substantially any shape that facilitates desired operation in conjunction with the magnetic components of front housing 86, middle housing 90 and rear housing 88.

Figure 5:
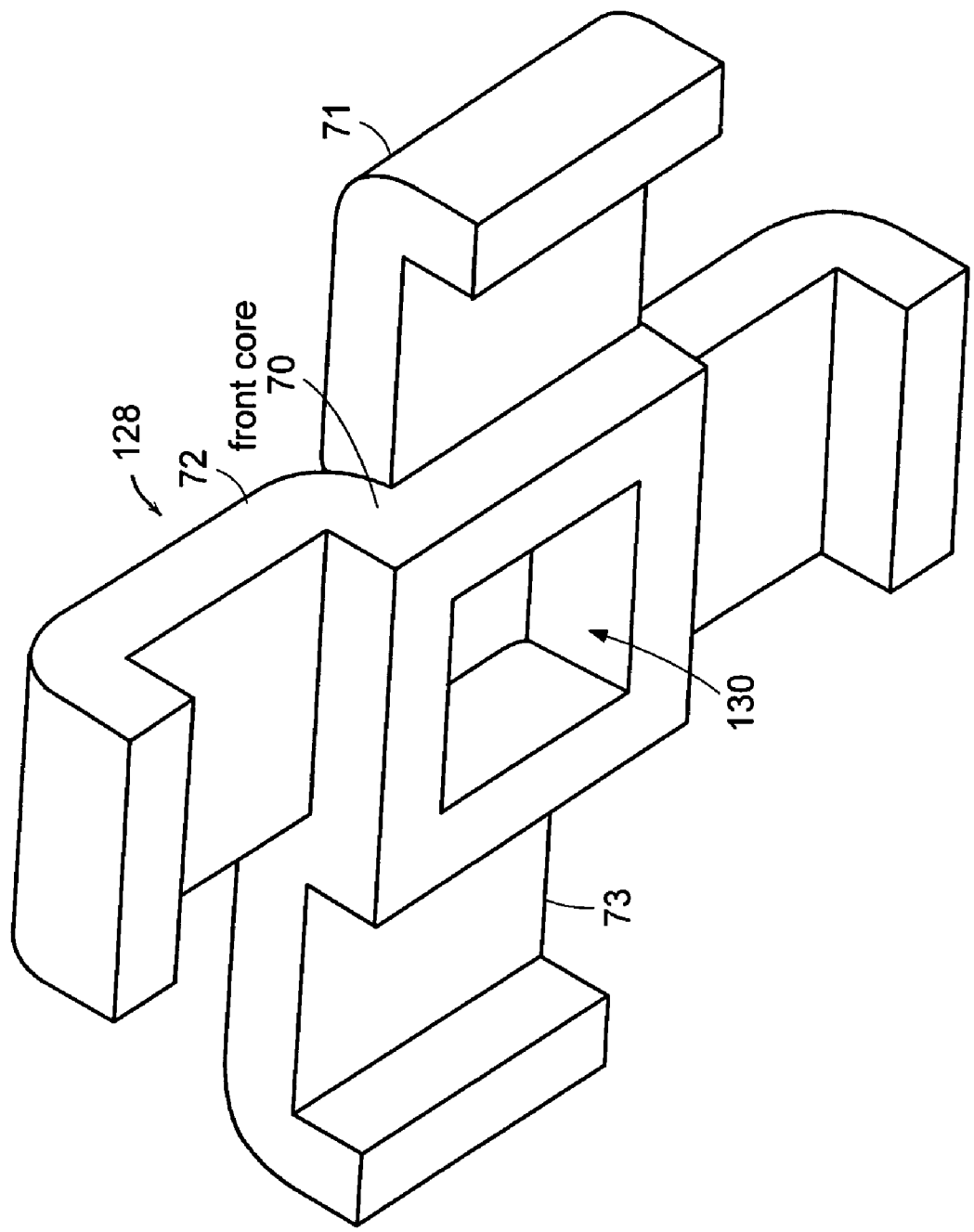
FIG. 5 illustrates an embodiment of a front core for use in a fast tool servo.
Figure 6:
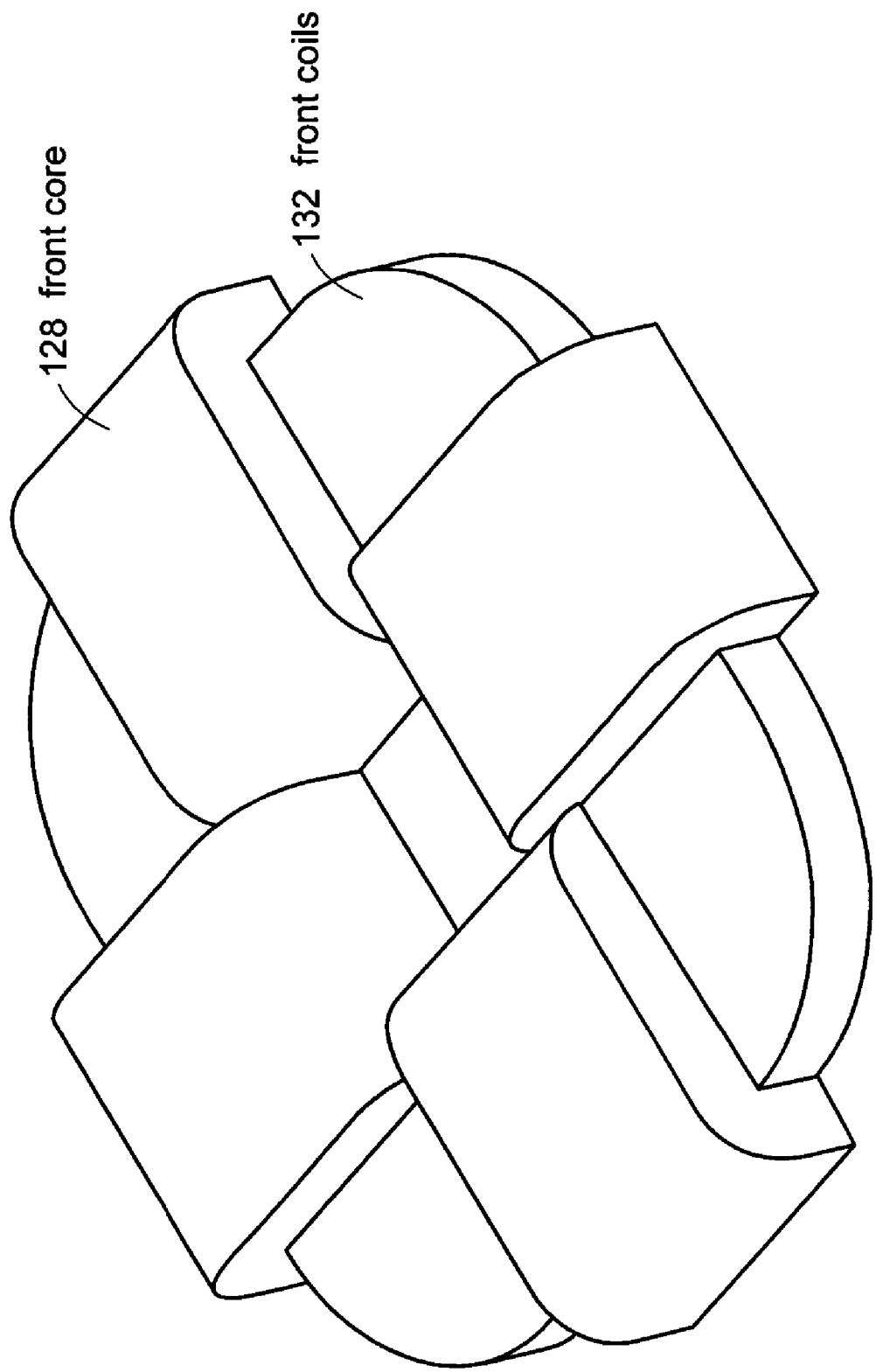
FIG. 6 illustrates the front core of FIG. 5 along with coils for carrying alternating current.

FIG. 5 illustrates a preferred embodiment of front core assembly 128 consisting of a first front core section 70, second front core section 72, third front core section 71 and fourth front core section 73. Front core assembly 128 has an inner volume 130 shaped to enclose shaft 14 with a determined clearance around each side of shaft 14. FIG. 6 illustrates front core assembly 128 along with a front winding assembly 132.

Figure 7:
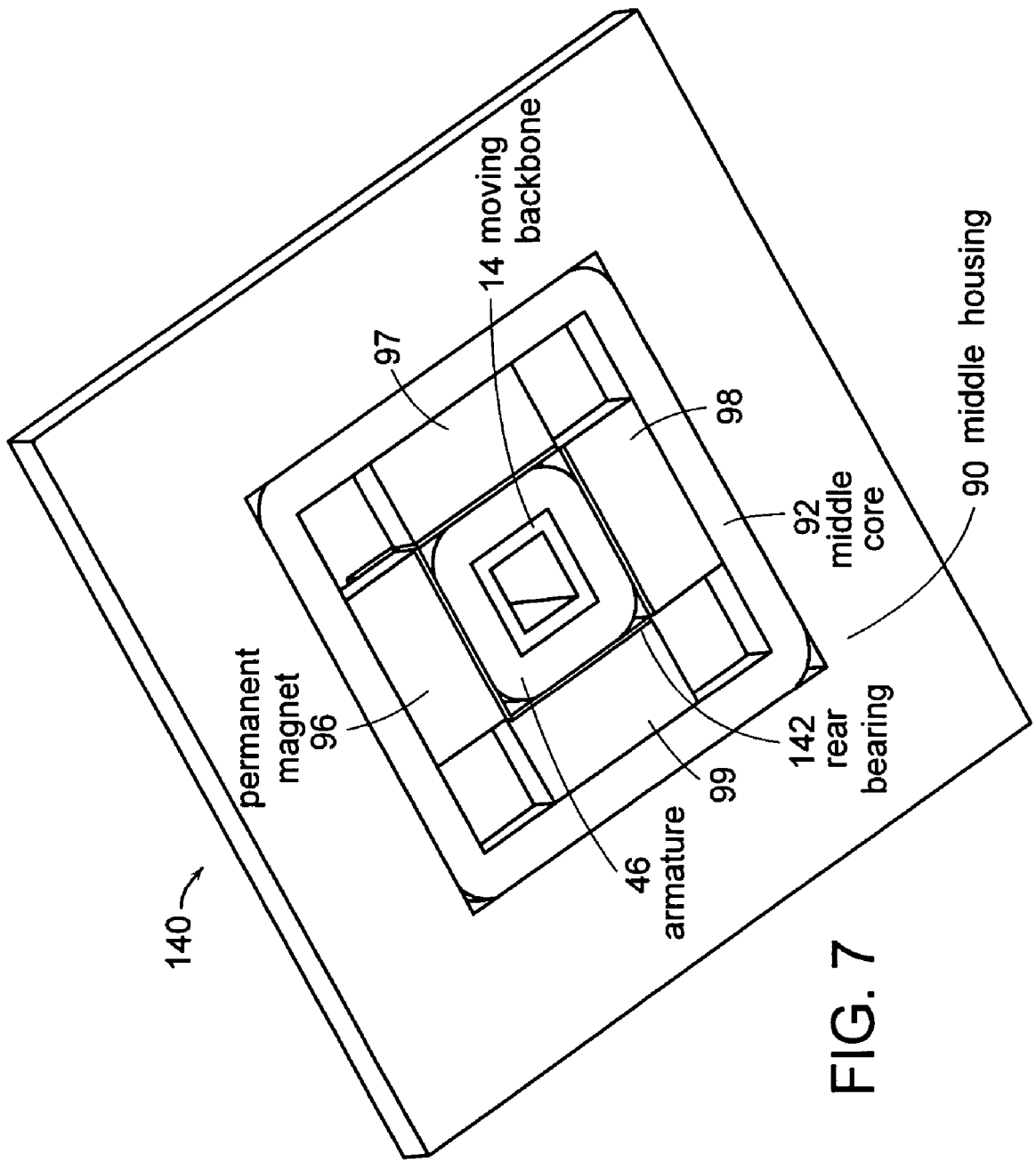
FIG. 7 illustrates a middle assembly of a fast tool servo in accordance with an embodiment of the invention.

FIG. 7 illustrates a middle assembly 140 consisting of middle core 92, middle housing 90, a rear bearing 142, and first, second, third and fourth permanent magnetics 96, 98, 97, 99, respectively.

Figure 8:
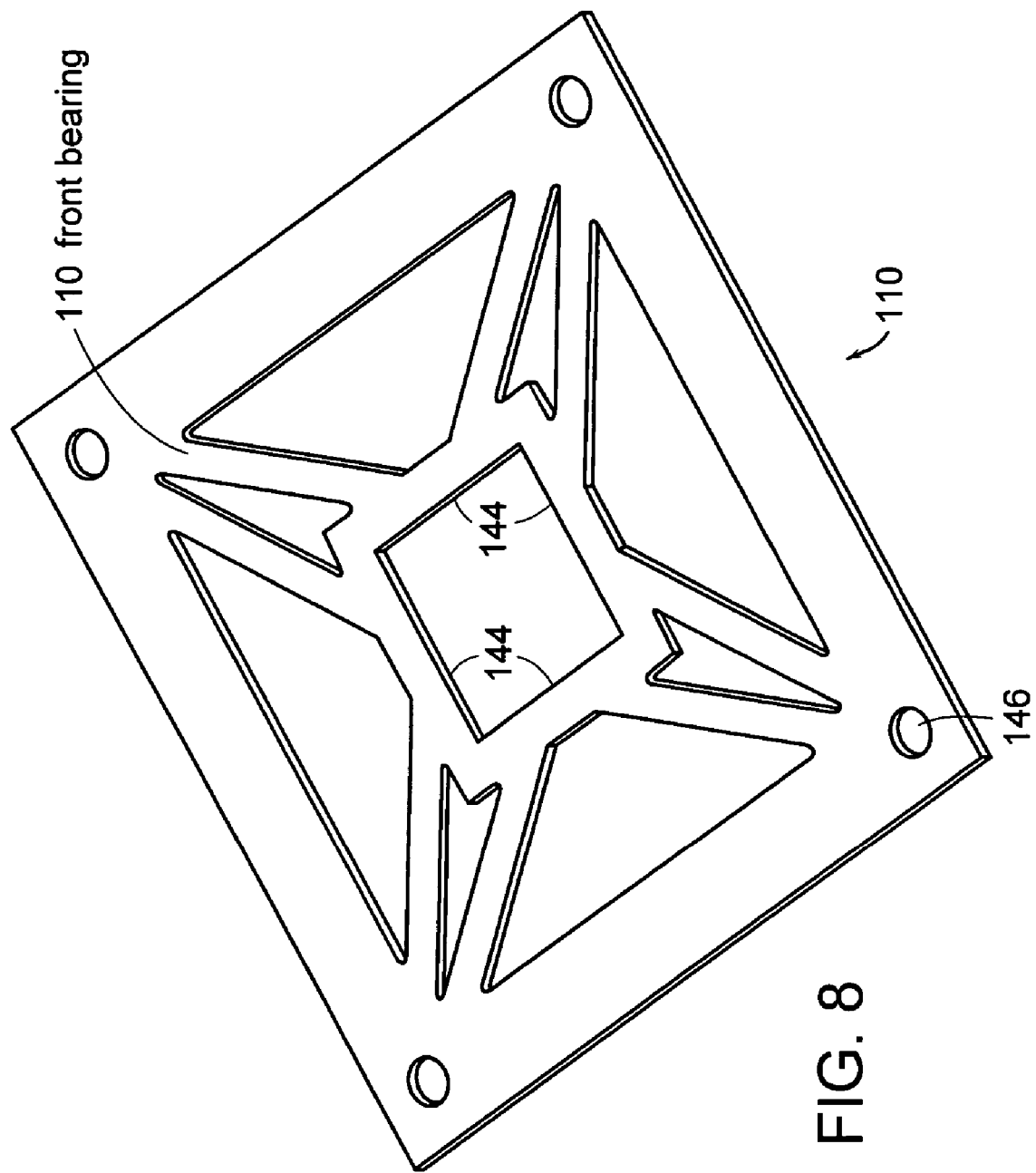
FIG. 8 illustrates an embodiment of a front flexure, or bearing.

FIG. 8 illustrates an embodiment of front flexure, or bearing, 110. Front flexure 110 is substantially planar in shape and cut so as to encircle shaft 14 using inner surfaces 144 while mounted to front housing 86. Front flexure 110 can be fitted with mounting holes 146. Front flexure 110 provides lateral stiffness and rotational stiffness to the armature and the shaft 14.

Figure 9A:
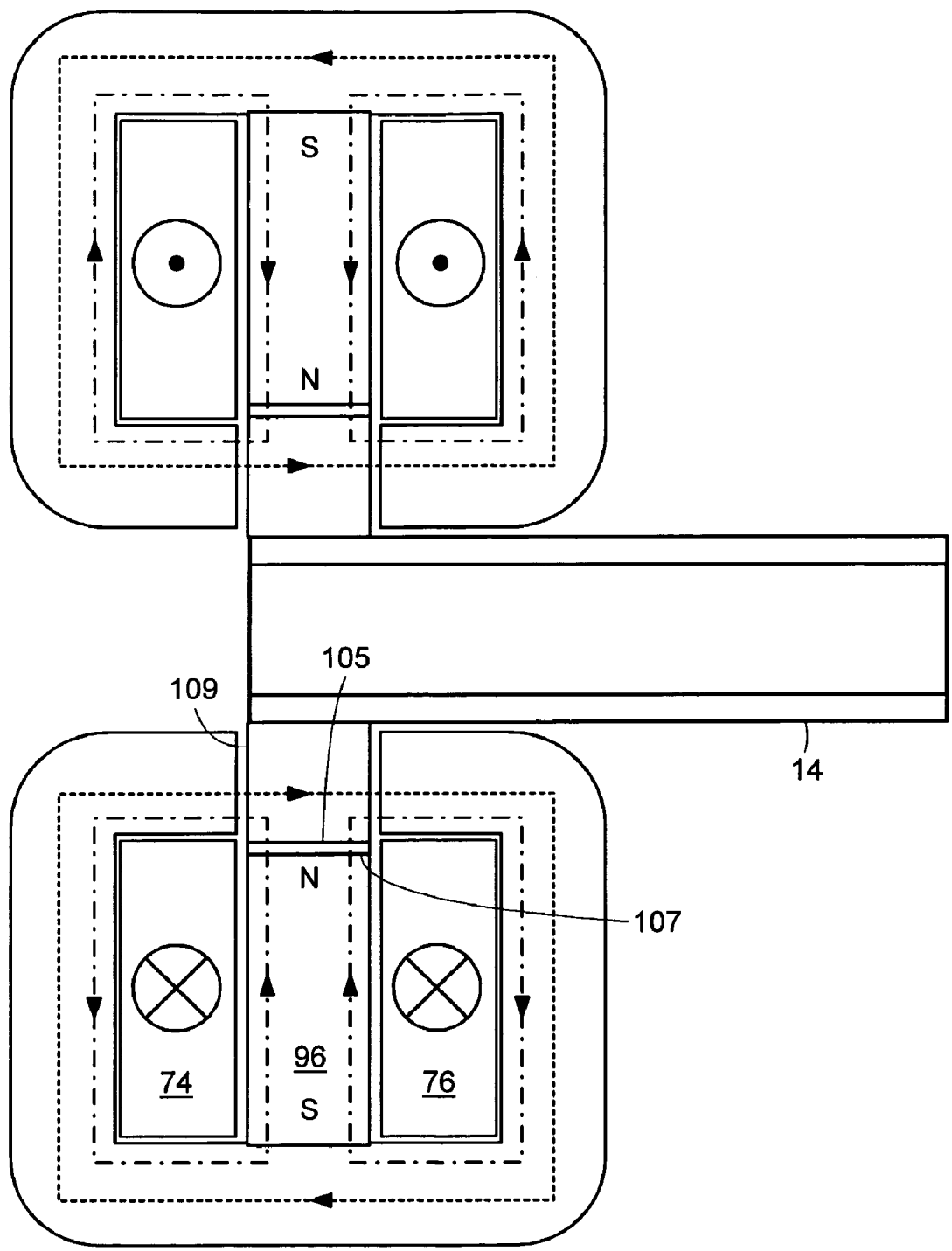
FIG. 9A illustrates various flux paths associated with an embodiment of a fast tool servo.

FIG. 9A illustrates flux paths associated with FTS 12. The direct current (DC), or steady state flux 150 is generated by permanent magnet 96. The arrow tips indicate the direction of magnetic induction fields. If the alternating current (AC), or varying, flux generated by coils 74 and 76 flows as shown, the magnetic induction field generated by the excitation current flows as shown by loop 154. The magnitude of the net force is proportional to the current inside the coil windings. If the current directions through the coils are reversed, the net force will be directed in the opposite direction. As such, bi-directional motion of the tool tip 108 is generated by reversing the current directions through the coils.

An elastic material can be positioned in the gap between the bias receiving surface 105 and the bias actuator surface 107.

The embodiment of FIG. 9A produces an actuating force that is a linear function of both the exciting current and armature displacement. Moving assembly 58 (FIG. 2D) consists of an armature 46 and motion backbone (shaft) 14 having high specific stiffness. The configuration of FIG. 9A allows the entire normal area of armature 56 to generate normal force since the flux bias is brought in through the radial faces of the armature 56. Moreover, the excitation coils 74, 76 are fully enclosed by the armature pole faces. Thus, more coil area can be accommodated while significantly reducing leakage flux.

The actuating force F is a linear function of exciting current I and the armature position X, which greatly simplifies the associated control laws. By normalizing these variables with $F_o$, $I_o$, and $X_o$, the force relation can be formulated as: $f=\eta\lambda$, $\lambda=I+\eta x$ where $f$, $\eta$, $\lambda$, $I$, and $x$ are normalized force, permanent magnet biasing strength, flux, and excitation current as defined below:

$f=F/F_o$, $i=I/I_o$, $q=B_{pm}/B_o$, $x-X/X_o$, $F_o=A_e B_{sat}^2/2\mu_o$, $B_o=B_{sat}/2$, $B_{pm}=B_r A_{pm}/2A_e$, $I_o=2X_o B_o/\mu_o N$.

Here $X_o$ is the air gap at neutral position, $B_{sat}$ is the saturation flux of the armature, $B_r$ is the remanence flux of the permanent magnet, $A_e$ is the effective armature pole face area, $A_{pm}$ is the pole face area of permanent magnet, and N is the turn number of excitation coil winding. From this result, it is clear that the actuating force f is more directly related to flux $\lambda$ than to exciting current i. By using a flux feedback method as shown later, we can thus achieve better linearity than using current control alone.

Figure 9B:
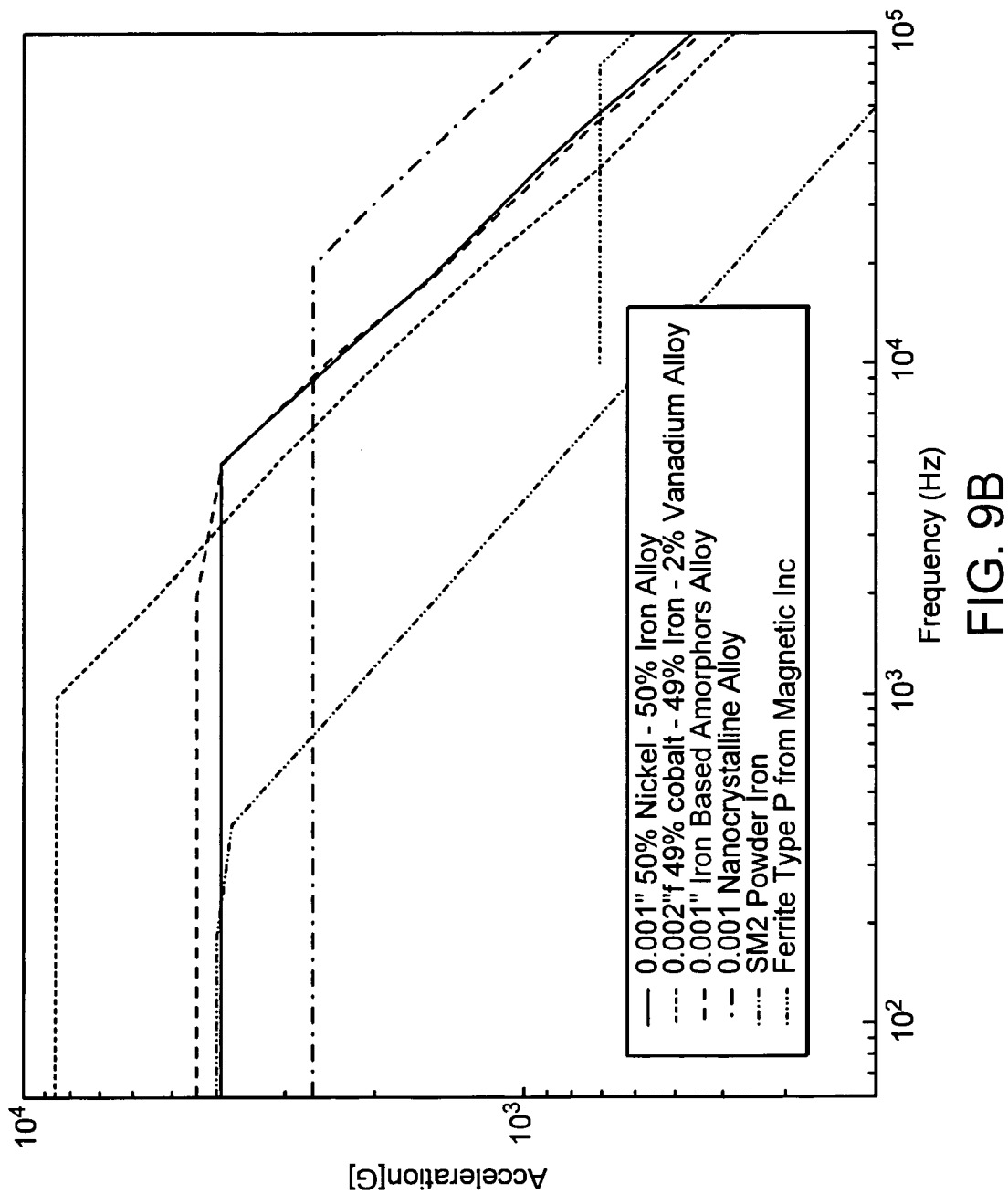
FIG. 9B illustrates various acceleration curves as a function of frequency for magnetic materials used in an embodiment of an armature.

FIG. 9B shows calculated maximum accelerations over frequency for various materials employed in embodiments of armature 46 having a thickness of 3 mm.

Figure 10:
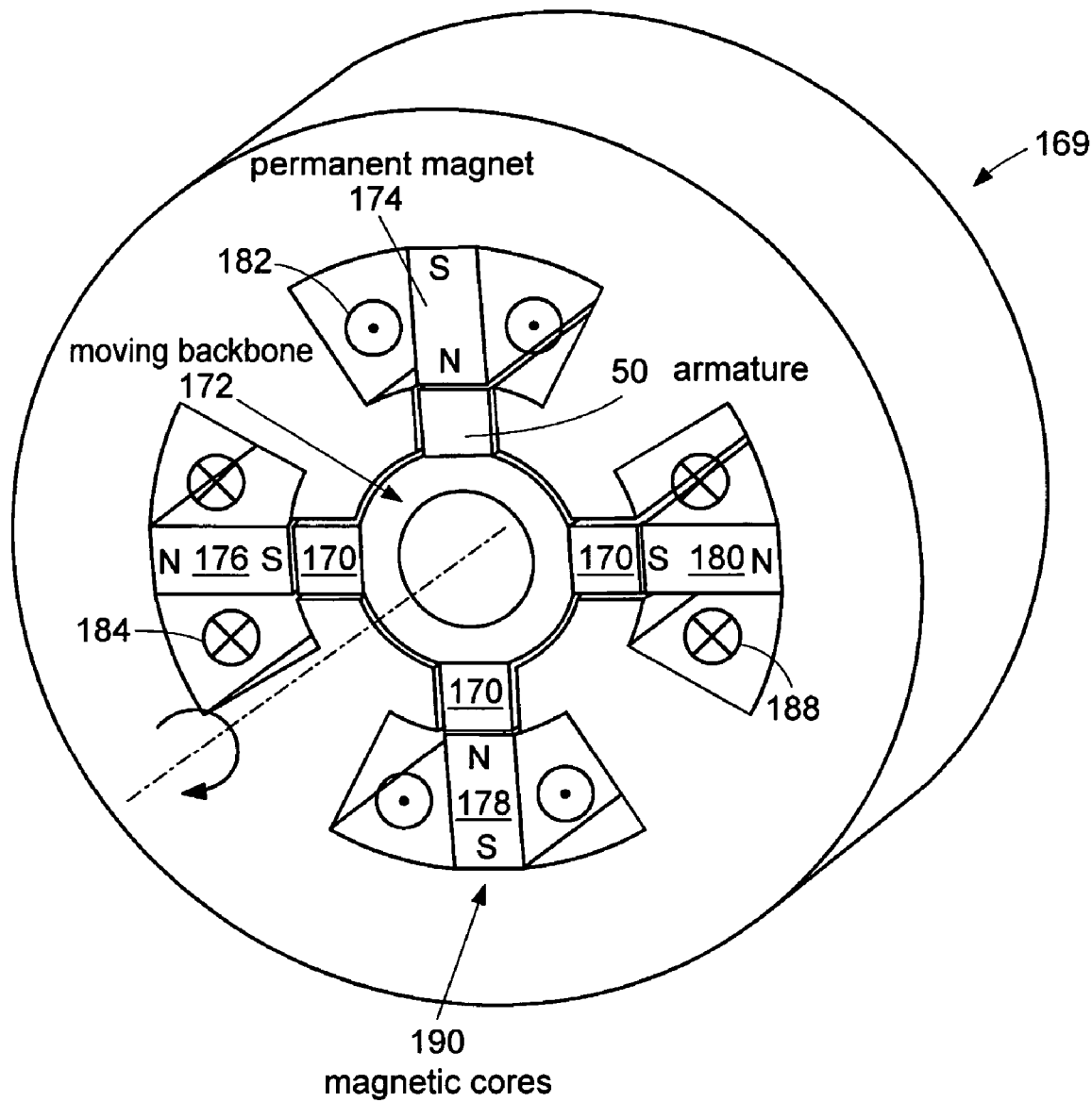
FIG. 10 illustrates an embodiment of an ultra fast rotary, motor that can be used for operating a cutting tool.

FIG. 10 illustrates a rotary embodiment 169 of FTS 12 which employs the principles discussed in conjunction with FIG. 9A. Rotary embodiment 169 includes a moving backbone 172 coupled to an armature 170. A rotary core 190 houses permanent magnets 174, 176, 178, 180, respectively. Each magnet includes a winding set having an AC current flow as shown. For example, magnet 174 has a winding employing a current flow 182 out of the page, magnet 176 has current flow 184 into the page, magnet 178 has current flow 186 out of the page, and magnet 180 has current flow 188 into the page. Moving backbone 172 may be fabricated out of lightweight material such as silicon carbide. Armature 170 and magnetic core 190 can be made from nanocrystalline laminations or other soft magnetic material. A supporting bearing can be rubber or laminated rubber and fitted between magnets 174, 176, 178, 180 and armature 190. As with the linear tool system, the bias is directed through the outer radial surfaces of the armature to achieve efficient linear high frequency operation.

Figure 11:
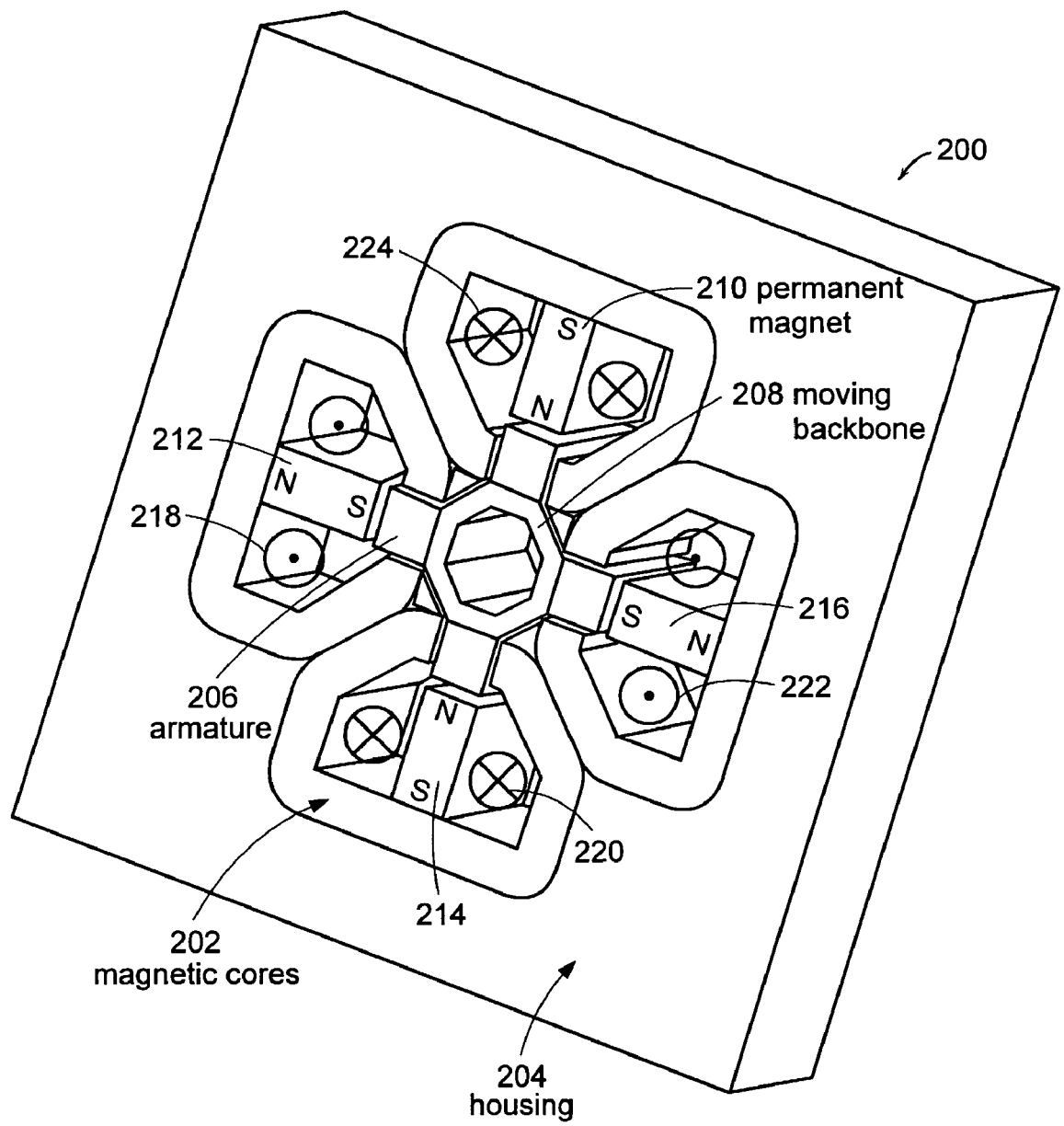
FIG. 11 illustrates an alternative embodiment of an ultra fast rotary motor having a substantially square housing.

FIG. 11 illustrates an alternative implementation for a rotary configuration of FTS. Rotary assembly 200 includes a magnetic core 202 retained in a housing 204. Within magnetic cores 202 are permanent magnets 210, 212, 214, 216 having respective windings with current directions 224, 218, 220, 222, respectively. Rotary assembly 200 also includes an armature 206 and moving backbone 208.

Figure 12:
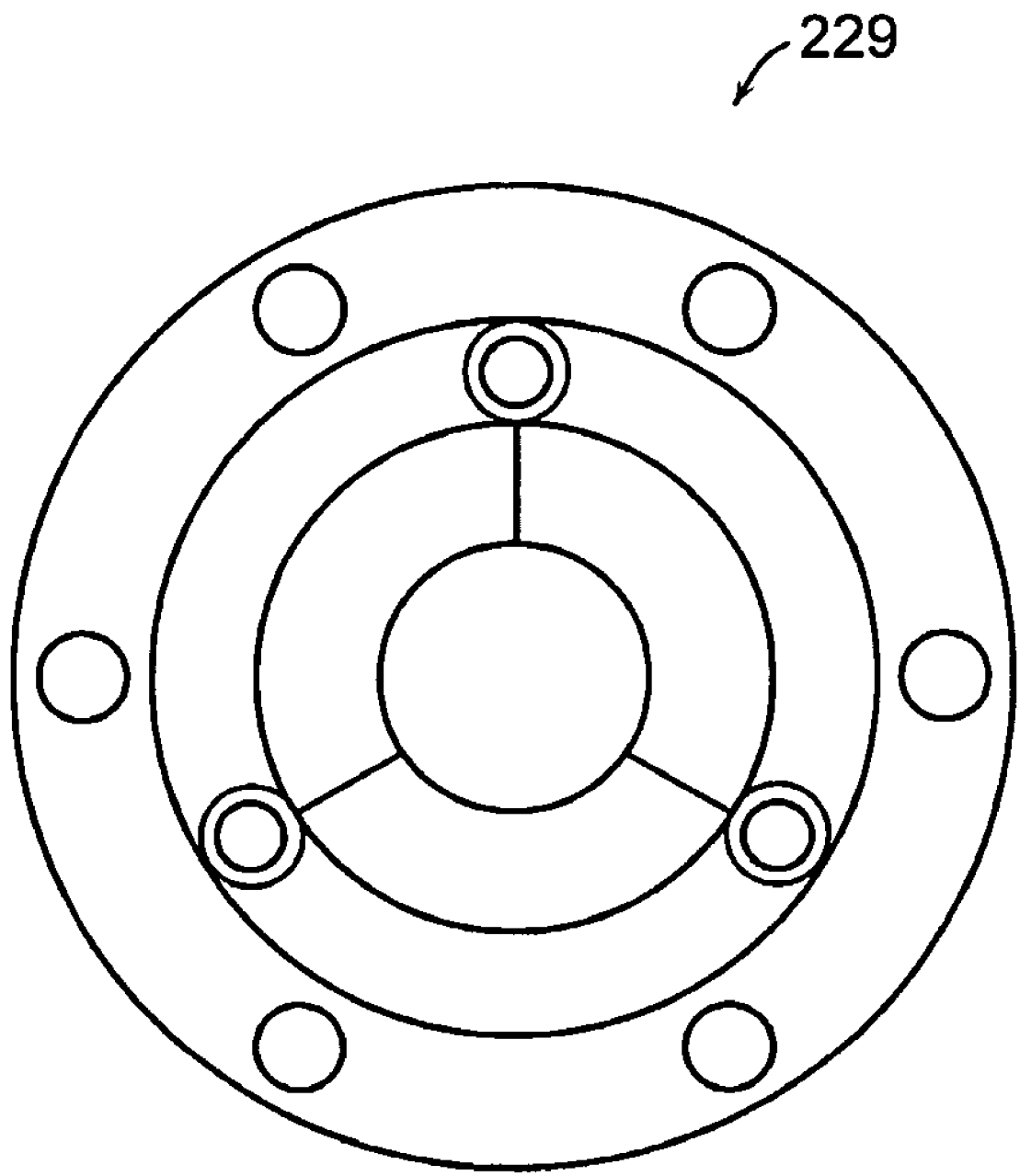
FIG. 12 illustrates a front body assembly having an armature in accordance with a preferred embodiment of the invention.

FIG. 12 illustrates a front body 229 containing an armature 46 and the flexure supporting the armature disk.

Figure 13A:
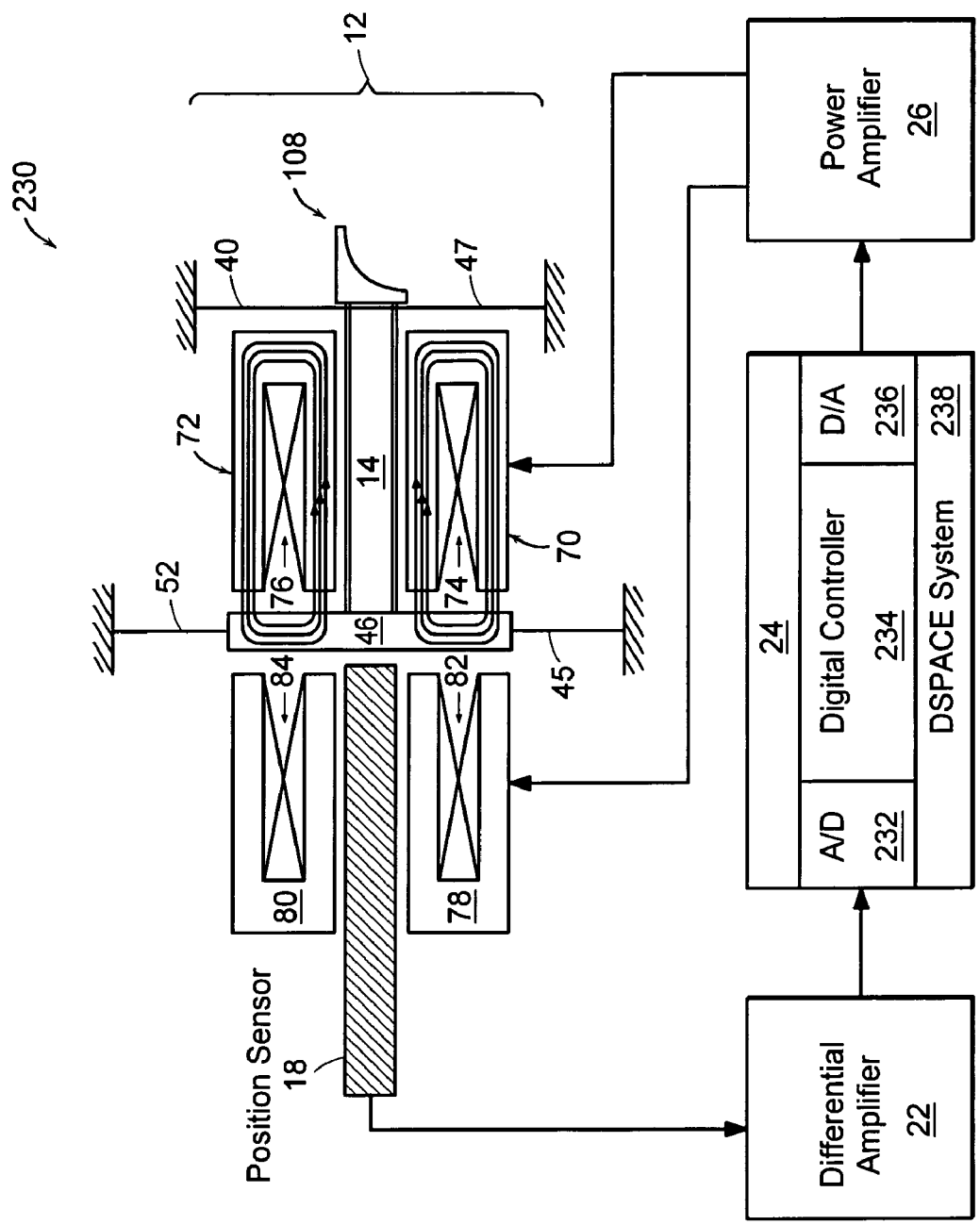
FIG. 13A illustrates a schematic representation of an embodiment of a fast tool servo and a controller.
Figure 13B:
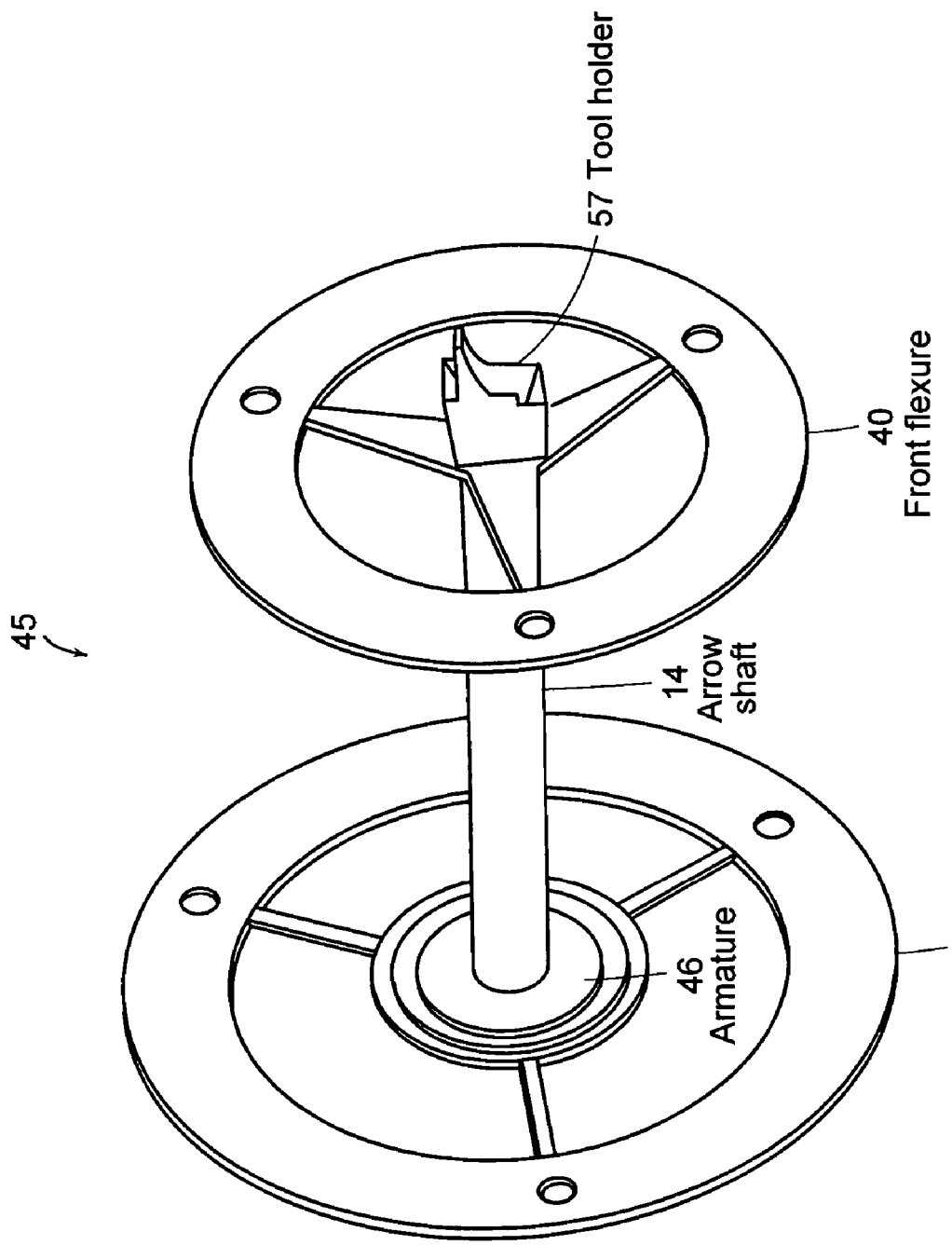
FIG. 13B illustrates a perspective view of the armature assembly with the flexure system in accordance with a preferred embodiment of the invention.

FIG. 13A illustrates a schematic representation of a system 230 for precisely operating tool tip 108. System 230 includes FTS 12, position sensor processor 18 implemented using a differential amplifier 22, power amplifier 26 and controller 24, including an analog-to-digital converter (A/D) 232 for receiving the position sensor signal, a digital-to-analog converter (D/A) 236 for producing an analog input signal to power amplifier 26, a digital controller 234 for executing machine-readable instructions necessary to control FTS 12 and a DSPACE digital control system for providing a user interface as well as machine-readable instructions to digital controller 234. The armature assembly 45 includes an armature 46 having flexures 40, 52 that provide lateral stiffness (FIG. 13B). The assembly also includes a tool holder 57 on the distal end of shaft 14.

FIG. 14 illustrates a system 250 for machining a workpiece in accordance with teachings herein. In particular, system 250 is a diamond turning machine (DTM). The DTM 250 is composed of three main parts: a machine base 252, a Z stage 254, and an X stage 256. The machine base 252 is made from concrete or granite, and is isolated from ground vibration by air legs and/or active vibration isolation systems. The X and Z stages are supported by a hydrostatic bearing system on the machine base 252, so that they can move along X and Z directions as shown in FIG. 14, respectively. The X stage 256 and Z stage 254 may be driven by linear motors.

On top of the X stage 256 is installed the spindle 272, which is supported by an air bearing. The workpiece 276, to be machined, is installed in the front end of spindle 272. A spindle encoder 274 is mounted at the back end of spindle 272 to measure the spindle rotation angle. FTS 12 is installed on Z stage 254 via FTS housing bearing 258, which guides the FTS housing to move only in Z direction relative to Z stage 254. FTS housing sensor 266 measures the position of the FTS 12 relative to Z stage 254. Tool tip 108 is installed in the front end of FTS 12. Z stage laser scale 270 measures the motion of Z stage 254 in the Z direction, while the X stage laser scale 268 measures that of X stage 256 in X direction. All position signals are fed into real-time computer 24 via signal conditioning modules 266 and 264, respectively. Real-time computer 24 outputs control signals to the linear power amplifier 26, which in turn drives the coils inside the FTS 12. A host computer 260 may communicate with real-time computer 24 to display the working status of system 250, and to receive commands from an operator. With appropriate motion coordination of X stage 256, Z stage 254, the spindle 272, and the FTS 12, arbitrarily shaped surfaces can be machined on workpiece 276 with high precision.

Figure 15A:
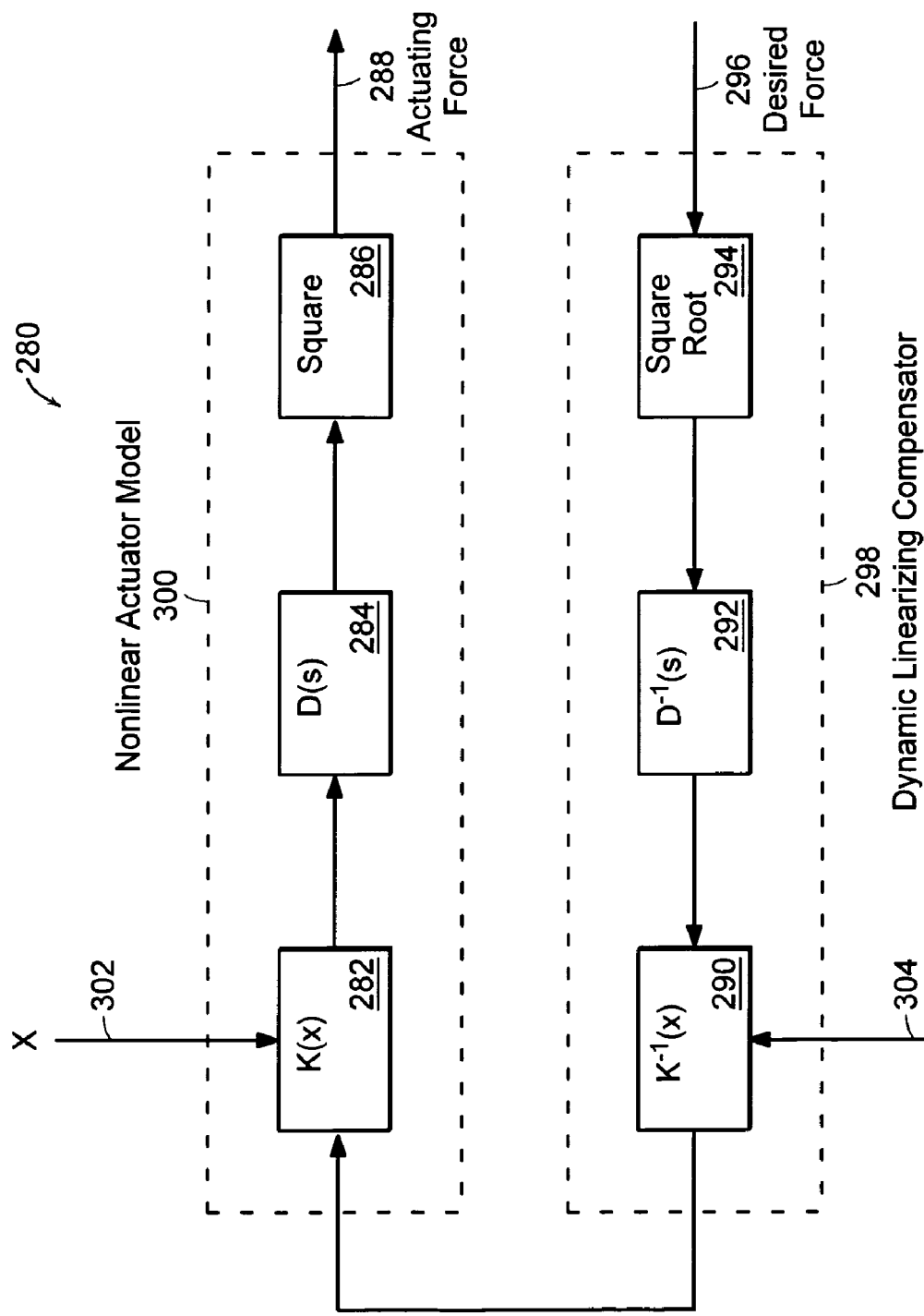
FIGS. 15A-15C illustrate exemplary control algorithms useful for operating embodiments of a fast tool servo.

FIG. 15A illustrates an exemplary control algorithm 280 that can be utilized in conjunction with FTS 12 and DTM 250. Electromagnetically driven actuators can be difficult to control in the sense that the actuating force is proportional to the current squared and inversely proportional to the air gap squared. Moreover, the force decreases with frequency because the magnetic field cannot penetrate the magnetic material at high frequencies. In order to compensate for these non-linear and frequency dependent characteristics, a dynamic non-linear compensation (DNC) control method 280 as shown in FIG. 15A is applied. Here K(x) 282 represents the relation between current and magnetic field, D(s) 284 the eddy current effect, and the "Square" block 286 relates the magnetic flux to the actuating force. This DNC control method uses a compensator 298 to partially compensate the non-linearity of the actuator, but is not expected to linearize the actuator completely because it is a feed-forward model-based method and modeling errors may exist. The whole position control loop is compensated with a lead-lag controller (including notch or resonant elements) and low-frequency integrator.

Figure 15B:
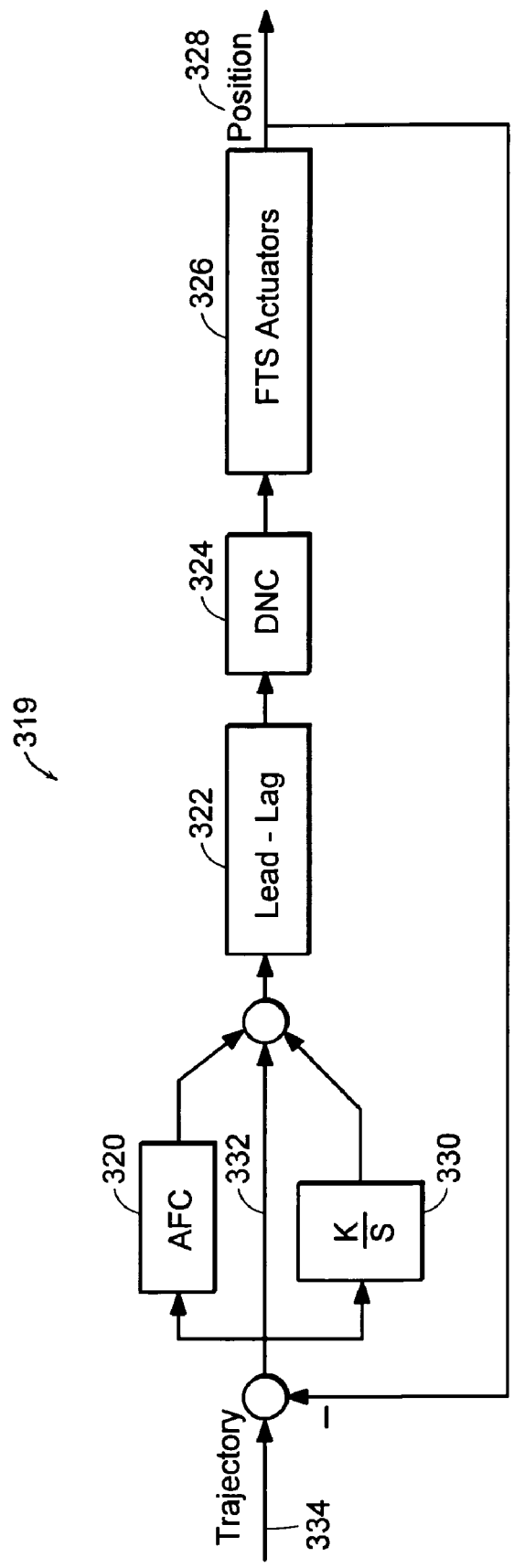
Figure 15C:
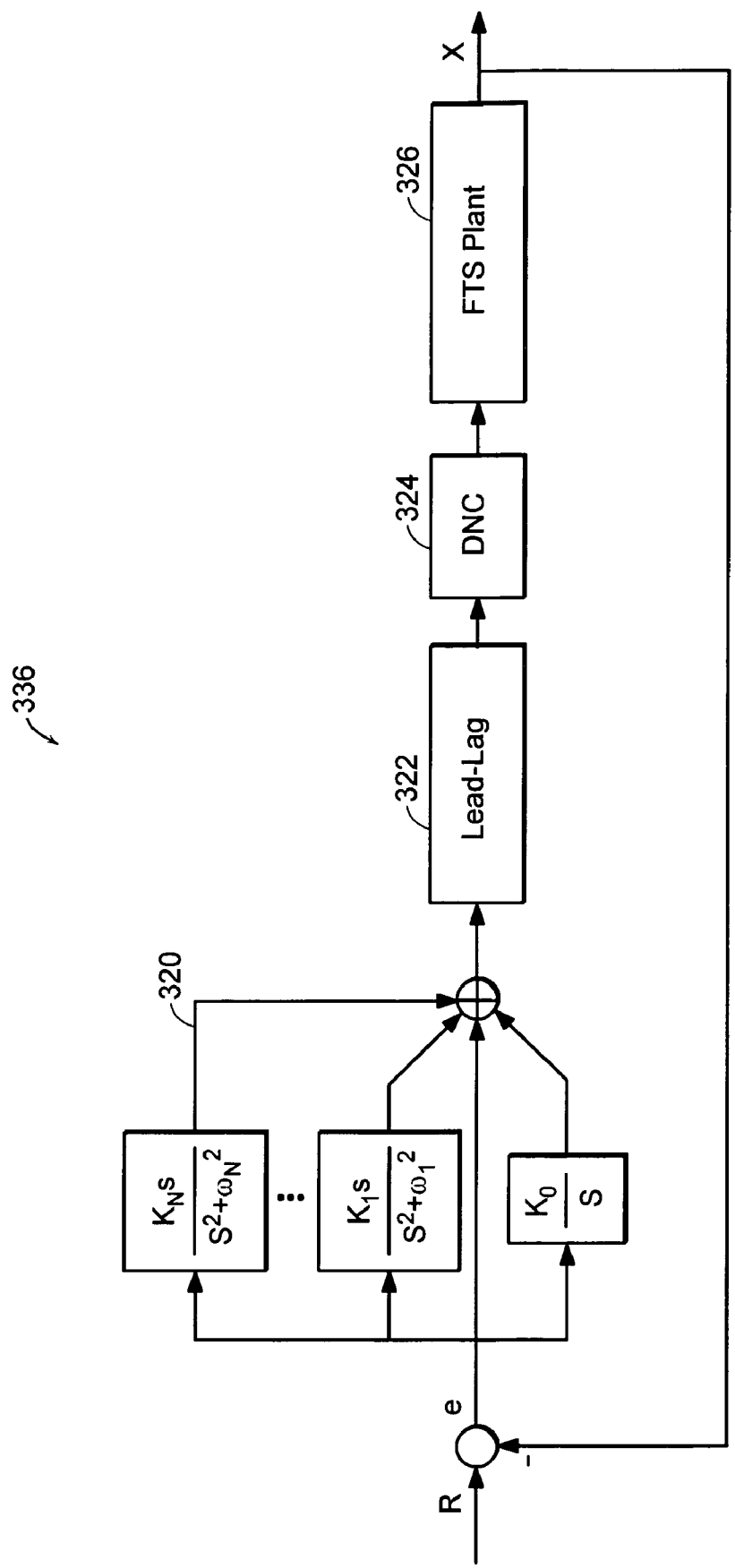

Different details of the system controller in accordance with a preferred embodiment of the present invention are shown in FIGS. 15B and C. At the spindle rotational frequency and its higher harmonics, a plug-in type adaptive-feed forward-compensation (AFC) controller 320 is used to improve the rejection of spindle-generated disturbance and to improve the spindle-synchronized trajectory tracking performance. The lead-lag controller 322 and the DNC 324 control provides the control mechanism for the FTS actuators 326. The position of the actuator provides the feed back control input into the control system 319.

Figure 16A:
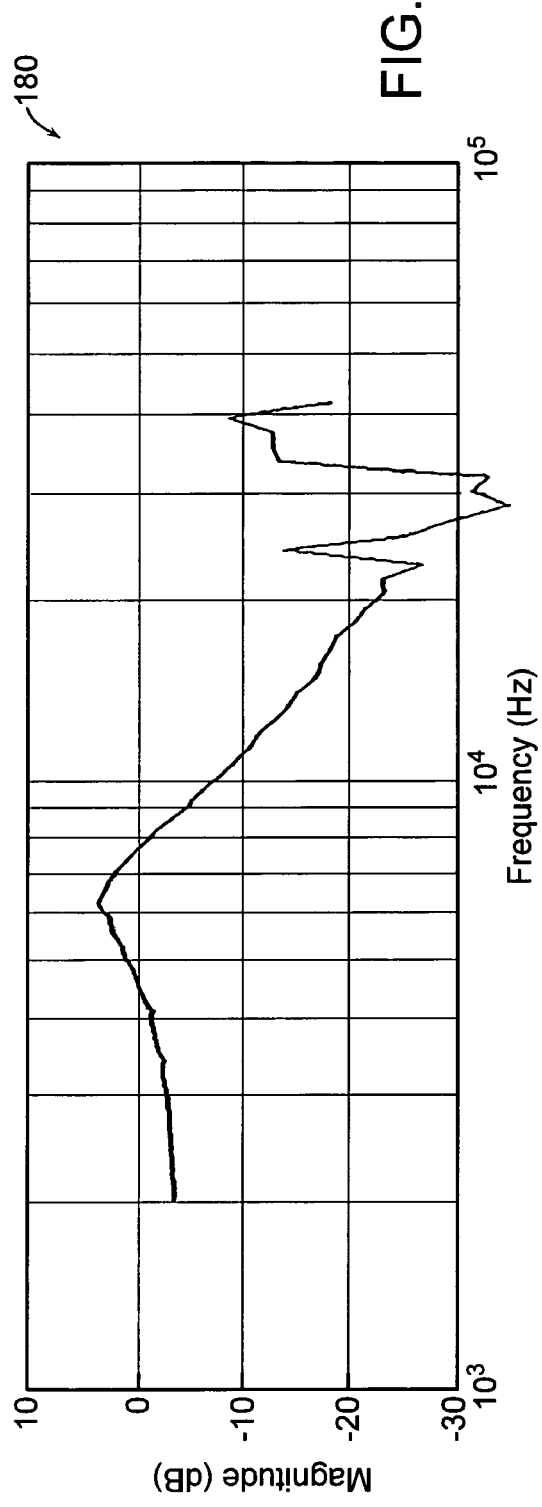
FIGS. 16A and 16B illustrate the closed loop frequency response, magnitude and phase, respectively, with respect to frequency in accordance with an embodiment of the invention.
Figure 16B:
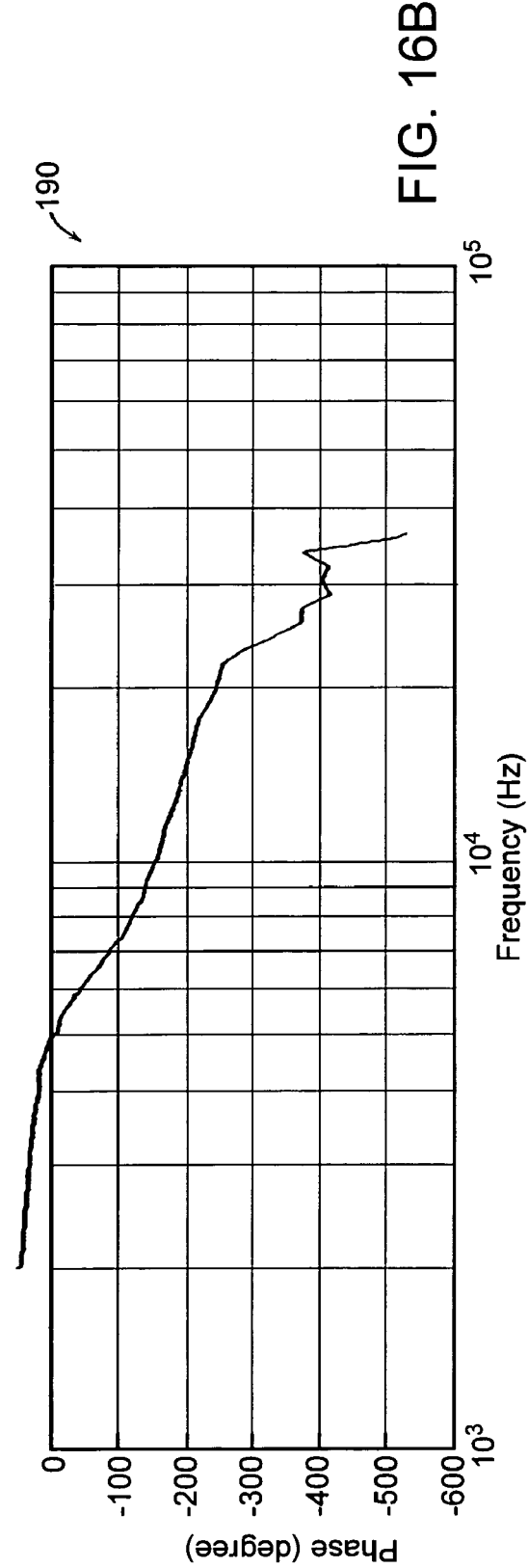
Figure 16C:
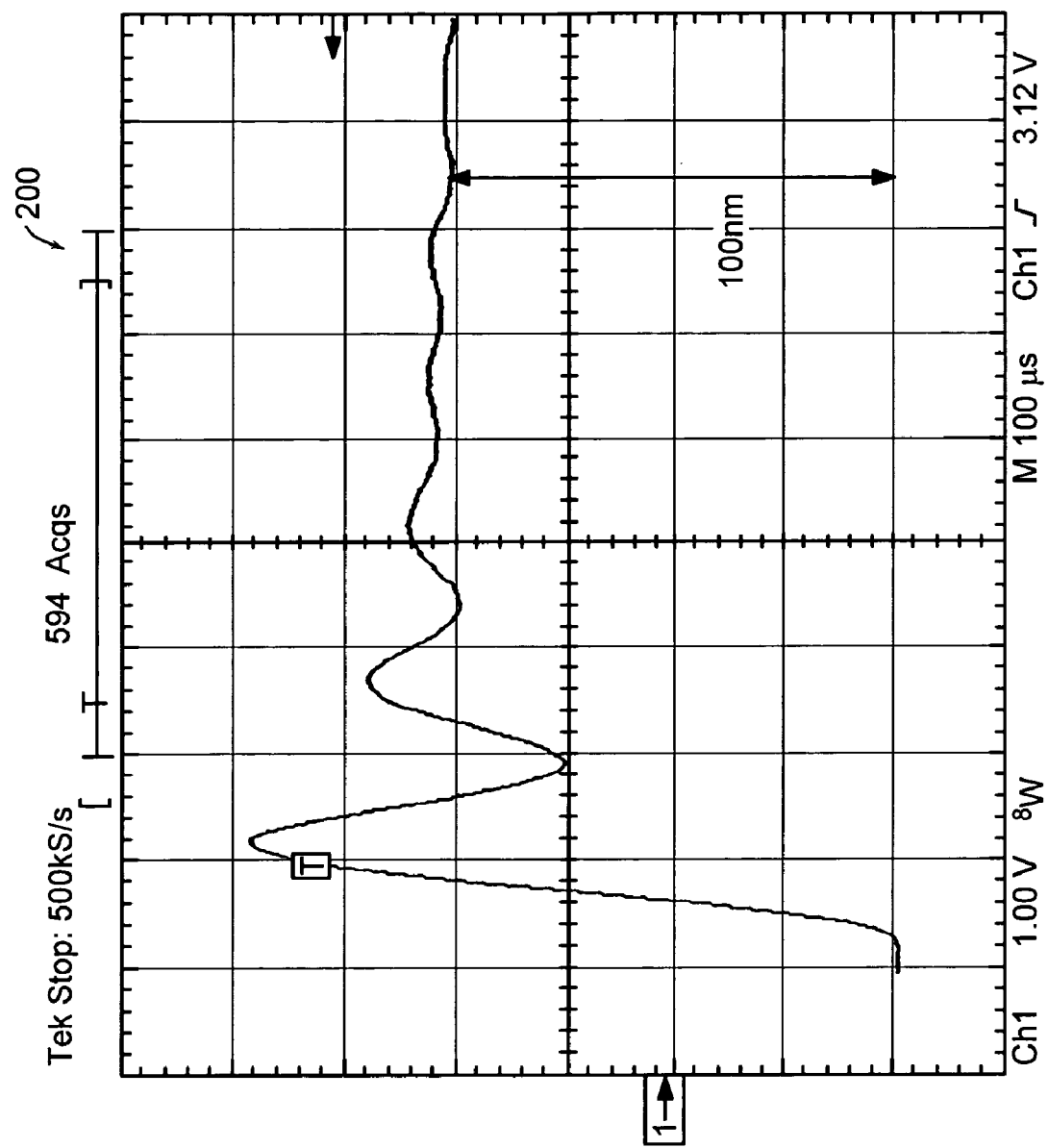
FIG. 16C illustrates a small signal closed loop step response in accordance with a preferred embodiment of a fast tool servo.

In one preferred embodiment, the controller is implemented with a DSPACE 1103 board, for example, wherein all the digital controllers are in the discrete domain. The full stroke of 50 μm can be achieved up to 1 kHz operation. The maximum acceleration is 160 G's when tracking a 9 μm peak-to-valley 3 kHz sine wave. For a sampling frequency of 100 kHz, the closed-loop frequency response is shown in FIGS. 16A and 16B. The small signal bandwidth can be as high as 10 kHz. For a sampling frequency of 83 kHz, the closed loop bandwidth is 8 kHz. The 100 nm closed-loop step response is shown in FIG. 16C.

The position error is approximately 1.2 nm RMS when the spindle is turned off. After the spindle is turned on, the error degrades to 3.5 nm RMS because of the pulse width modulation (PWM) noise from the spindle amplifier. To evaluate the tracking performance, a 10 μm peak-to-valley 1 kHz sine wave trajectory may be applied to drive the fast tool servo. When the AFC is not included in the control loop, the tracking error is approximately 1.048 μm RMS. When the first harmonic AFC is applied, the error is reduced to approximately 0.0214 μm RMS. The tracking error reduces to approximately 0.0148 μm RMS when the second harmonic AFC is further applied and to approximately 0.0073 μm RMS when the third harmonic is also added. This illustrates that the non-linearity of the actuator and the power amplifier introduces disturbance forces of second and higher order harmonics, and the AFC of poles at multiple harmonic frequencies can significantly improve the tracking error. FIG. 16D illustrates tabulated results showing the performance of the adaptive feed forward control in accordance with a preferred embodiment.

Figure 17A:
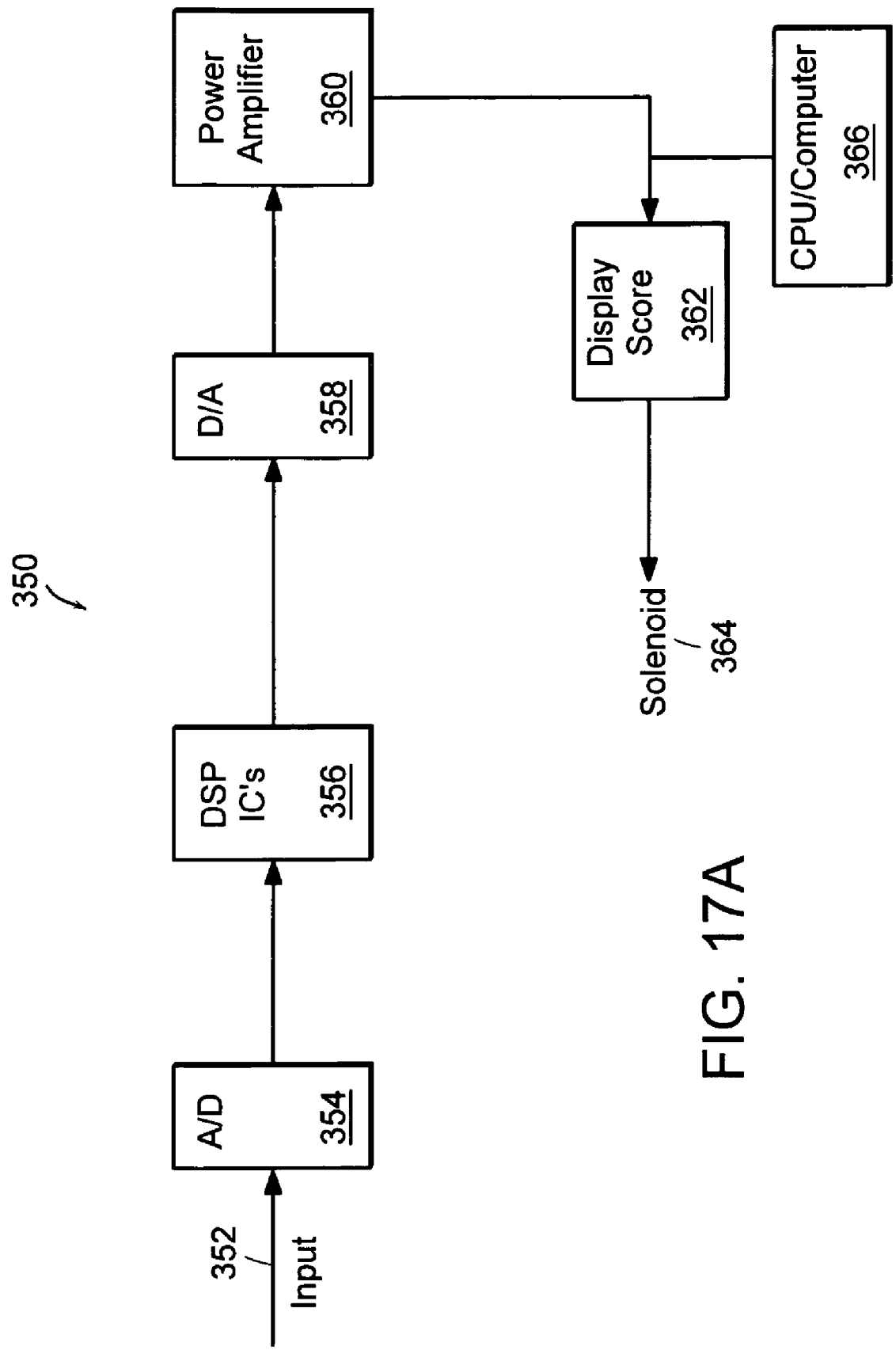
FIGS. 17A and 17B illustrate embodiments of a controller that can be used for operating a fast tool servo.

In accordance with an alternate preferred embodiment, the controller 300 includes at least three digital signal processing (DSP) integrated circuit chips such as, for example, TS 101 chips provided by Analog Devices. These may be multiple DSP chips. The bandwidth of the FTS can be increased to approximately 20±5 kHz using the DSP chips. In an embodiment of controller 380 a computation power on the order of 5.4 G FLOPS is achieved using three DSP's 382A-C operating in parallel at speeds of 300 MHz. This embodiment produces a 1 MHz control loop having a delay on the order of 1.8 μs. Total harmonic distortion for A/D 392 and D/A 398 is less than −88 dB up to 50 kHz. Therefore, embodiments of system 10 can operate with tool speeds on the order of 50 kHz. FIG. 17A illustrates a schematic diagram of the control system 350 in accordance with a preferred embodiment of the present invention using the DSP integrated circuits 356. The input 352 is indicative of the position information of the actuators. In a preferred embodiment, the signal 352 is the output from the capacitance probe 18. The input signal is digitized by the analog to digital (A/D) converter circuit 354, the output of which forms the input to the DSP control circuit 356. The output of the DSP circuit is then converted to an analog signal by the D/A converter circuit 358 and the output of which forms the input to the power amplifier 360. The output of the power amplifier is provided to the solenoids. An oscilloscope or display unit 362 can be used in the control loop in a preferred embodiment. Additionally a central processing unit 366 or a computing device such as, for example, a high-speed real time computer can be included in the control loop to monitor the control system. Memory units can also be added in preferred embodiments. Flux feedback and sensing elements can also be incorporated in the preferred embodiment FTS.

Figure 17B:
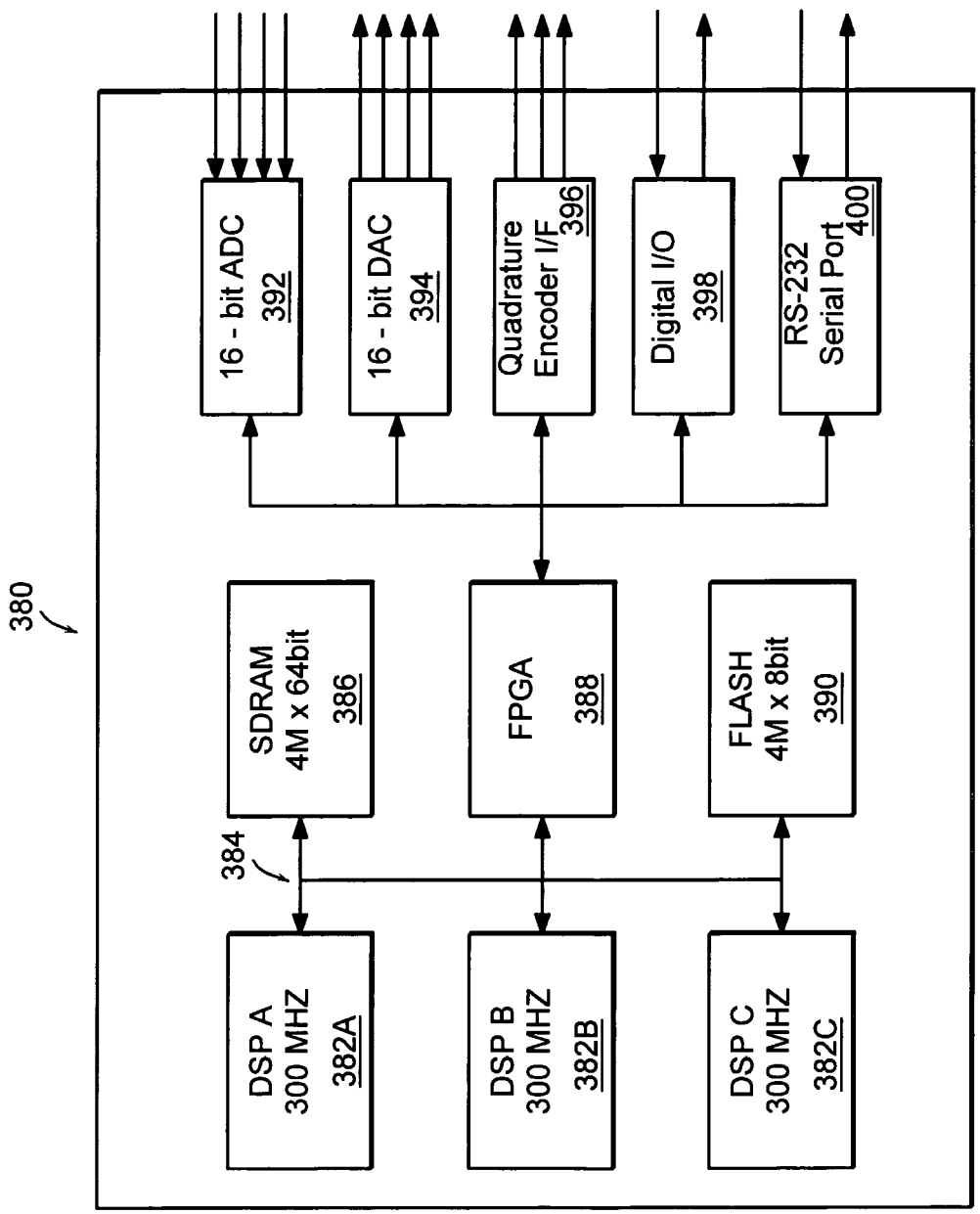

FIG. 17B is a schematic block diagram of the real time computer 380. Computer 380 includes three digital signal processors (DSP 382A, DSP 382B, and DSP 382C), which share a common cluster bus 384 with the synchronous dynamic random access memory (SDRAM) 386, the field programmable gate array (FPGA) 388, and the electrically-erasable read only memory (FLASH) 390. Through the FPGA 388, three processors 382A-C can read/write 392 peripheral resources, such as 16-bit analog-to-digital converters (ADC), 16-bit digital-to-analog converters (DAC) 394, quadrature encoder interfaces 396, digital inputs/outputs (I/O) 398, and RS-232 serial port 400. The tool tip sensor 18 and the FTS housing sensor 266 are fed into the ADC of the real-time computer. The Z-stage laser scale 270, the X-stage laser scale 268 and the spindle encoder 274 connect to encoder interfaces of the real-time computer. The DACs 394 output control signals to the linear power amplifier 26. The real-time computer communicates with host computer 260 via RS-232 serial port 400.

Figure 18A:
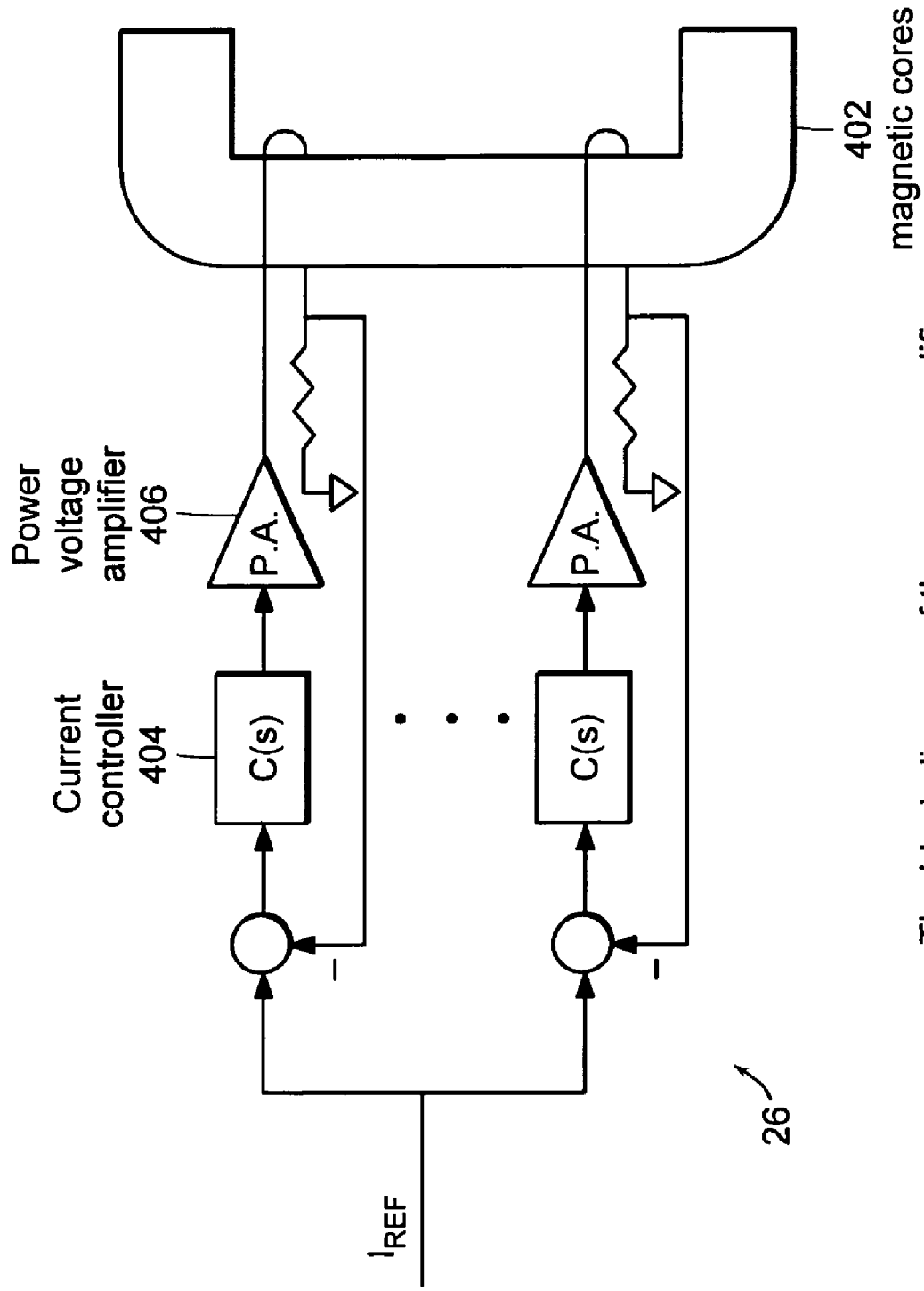
FIGS. 18A through 18C illustrate schematic representations of embodiments of a power amplifier that can be used when practicing embodiments of a fast tool servo.

FIG. 18A is a block diagram of power amplifier 26. Magnetic cores 402 are a representation of the magnetic path composed by the front core 70, the middle core 92, the rear core 78, and armature 46. Surrounding the magnetic cores 402, multiple-start windings are driven separately by power voltage amplifiers 406 in parallel. The current of each winding is controlled independently with separate current controllers 404, which are driven by the same reference current signal $I_{REF}$.

Figure 18B:
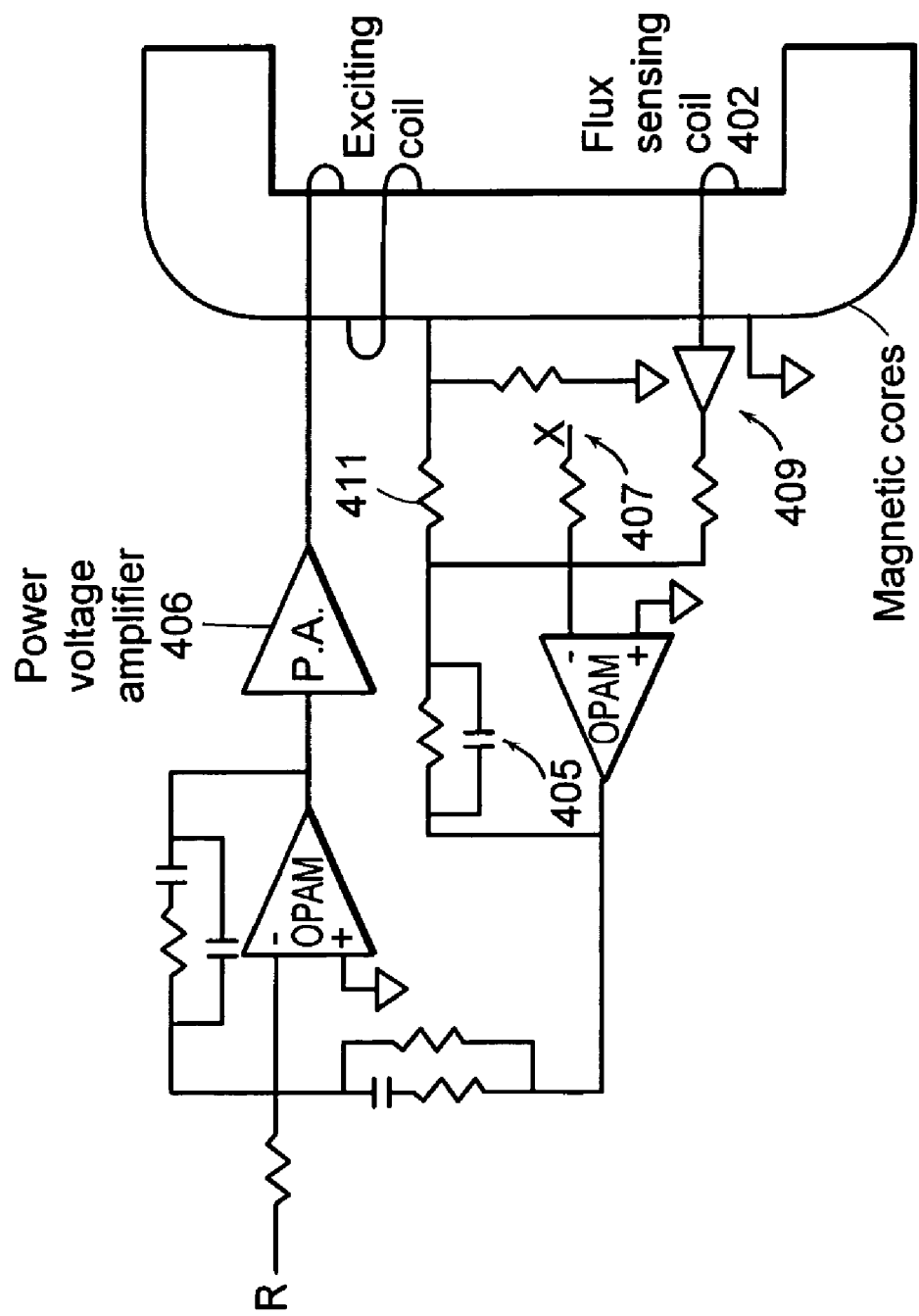

FIG. 18B illustrates the power amplifier circuit in greater detail. The embodiment of FIG. 18B produces 1 KW of output power over a linear range. Four APEX PA52A amplifiers are driven in parallel to drive the excitation coils 74, 76. Using fluxing sensing coils 402, a flux sensing circuit 409 is integrated into the current feedback path as shown in FIG. 18B to feed back the generated flux at high frequencies. The embodiment of FIG. 18B works in current mode at low frequencies, and works in flux mode at high frequencies where the current feedback signal rolls down and the flux feedback signal rolls up. The circuit includes current sensor 411 and low pass filter 405. Consequently, better linearity can be achieved at high frequencies. Additionally, armature position x-407 is fed back to compensate the negative spring effect of the ultra fast motor using an analog feedback loop, which maintains a higher bandwidth than a comparable digital implementation.

Figure 18C:
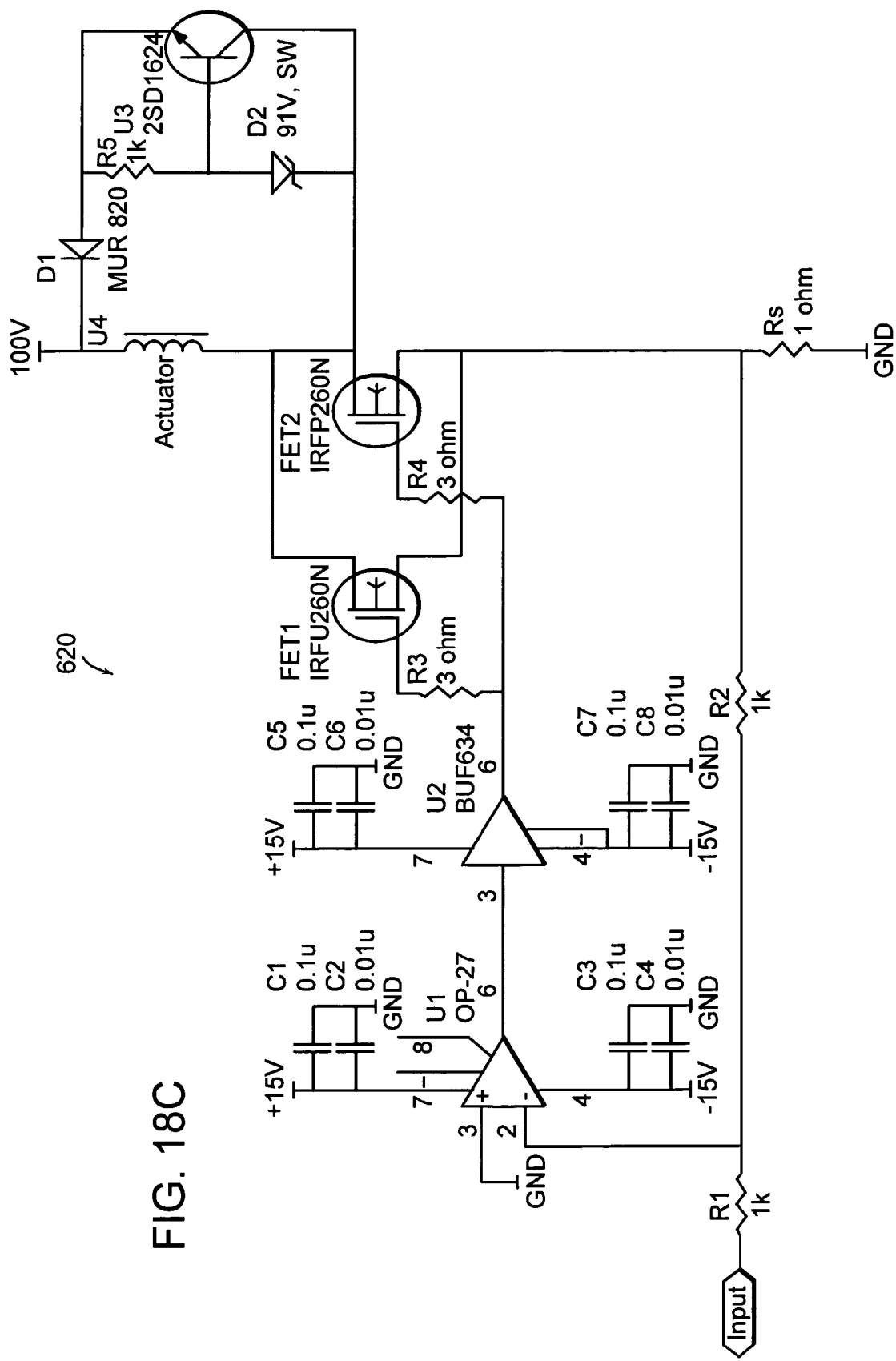

FIG. 18C contains a more detailed schematic diagram of power amplifier 26.

Figure 19A:
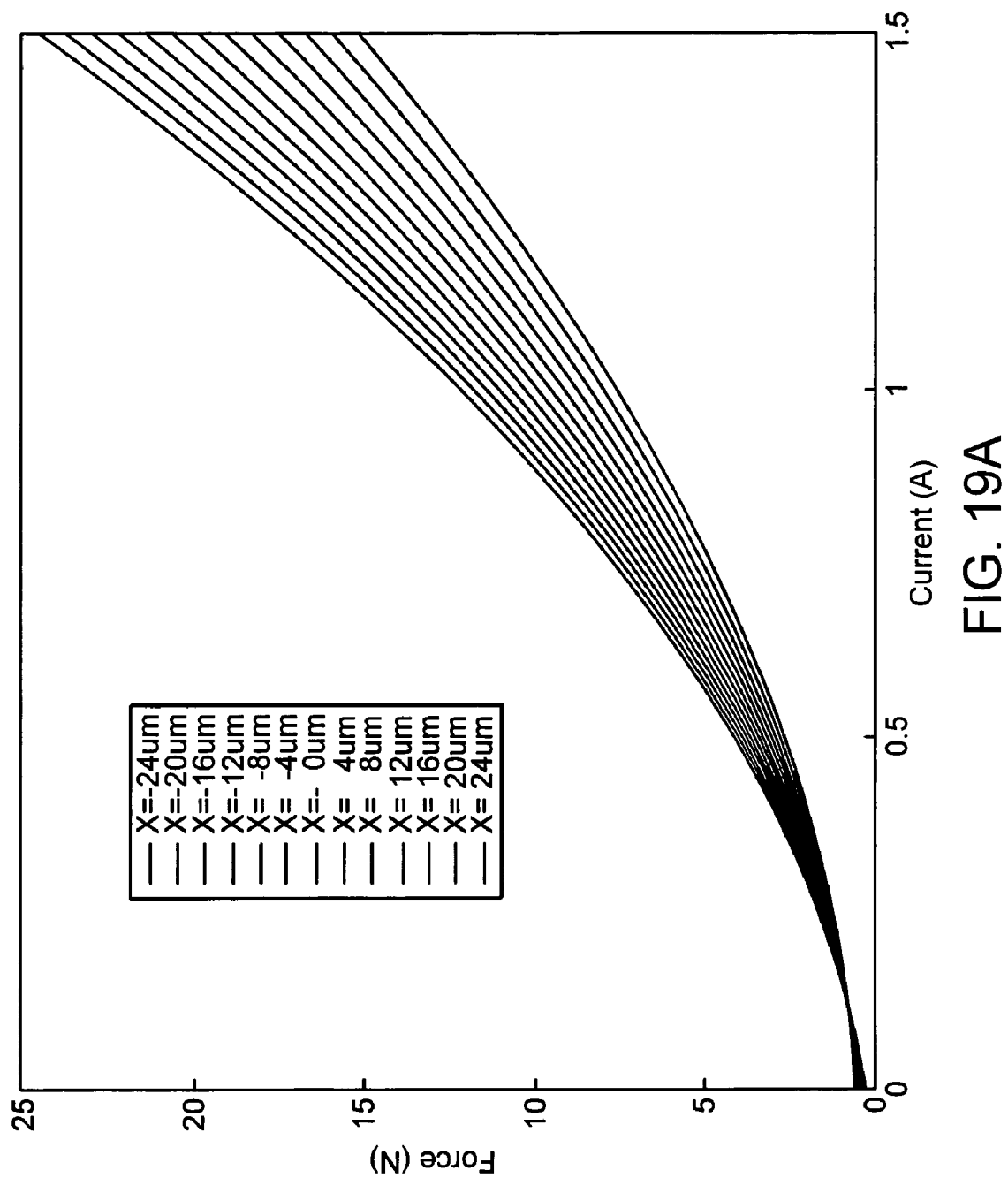
FIG. 19A illustrates the static performance of the actuator in accordance with a preferred embodiment of the present invention, in particular, a plot of force (N) versus current (A)
Figure 19B:
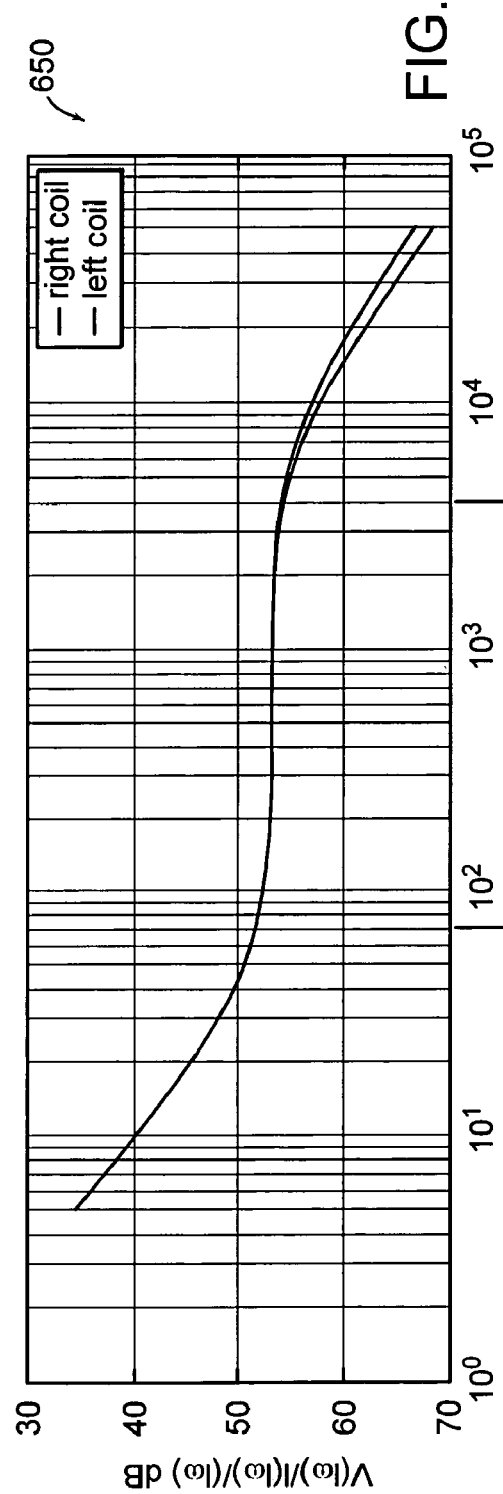
FIGS. 19B and 19C illustrate the dynamic performance of the actuator in accordance with a preferred embodiment of the present invention.
Figure 19C:
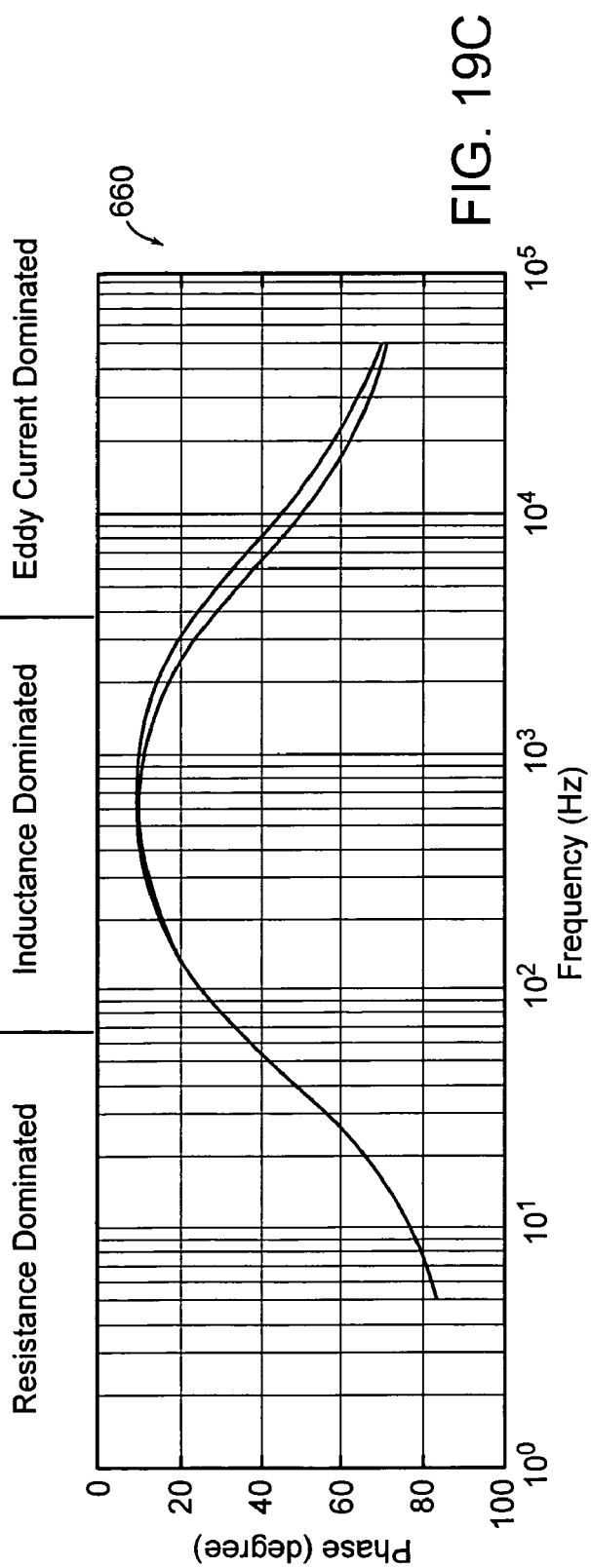

FIG. 19A illustrates the static performance of the actuator in accordance with a preferred embodiment of the present invention, in particular, a plot of force (N) versus current (A). FIGS. 19B and 19C illustrate the dynamic performance of the actuator in accordance with a preferred embodiment of the present invention.

Figure 19D:
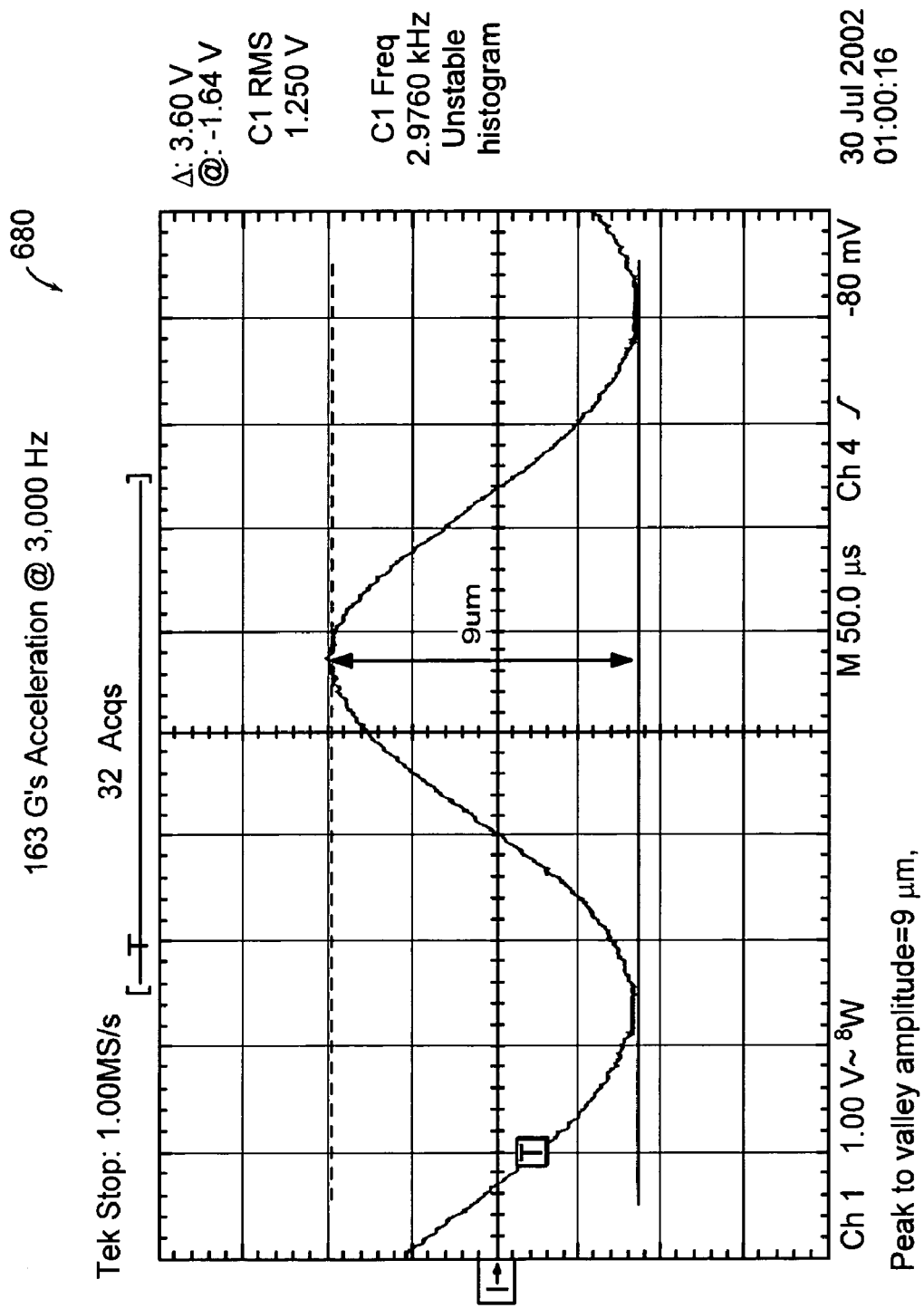
FIG. 19D illustrates the acceleration of the fast tool servo when tracking a 9 μm peak-to-valley 3 kHz sine wave in accordance with a preferred embodiment of the present invention.
Figure 19E:
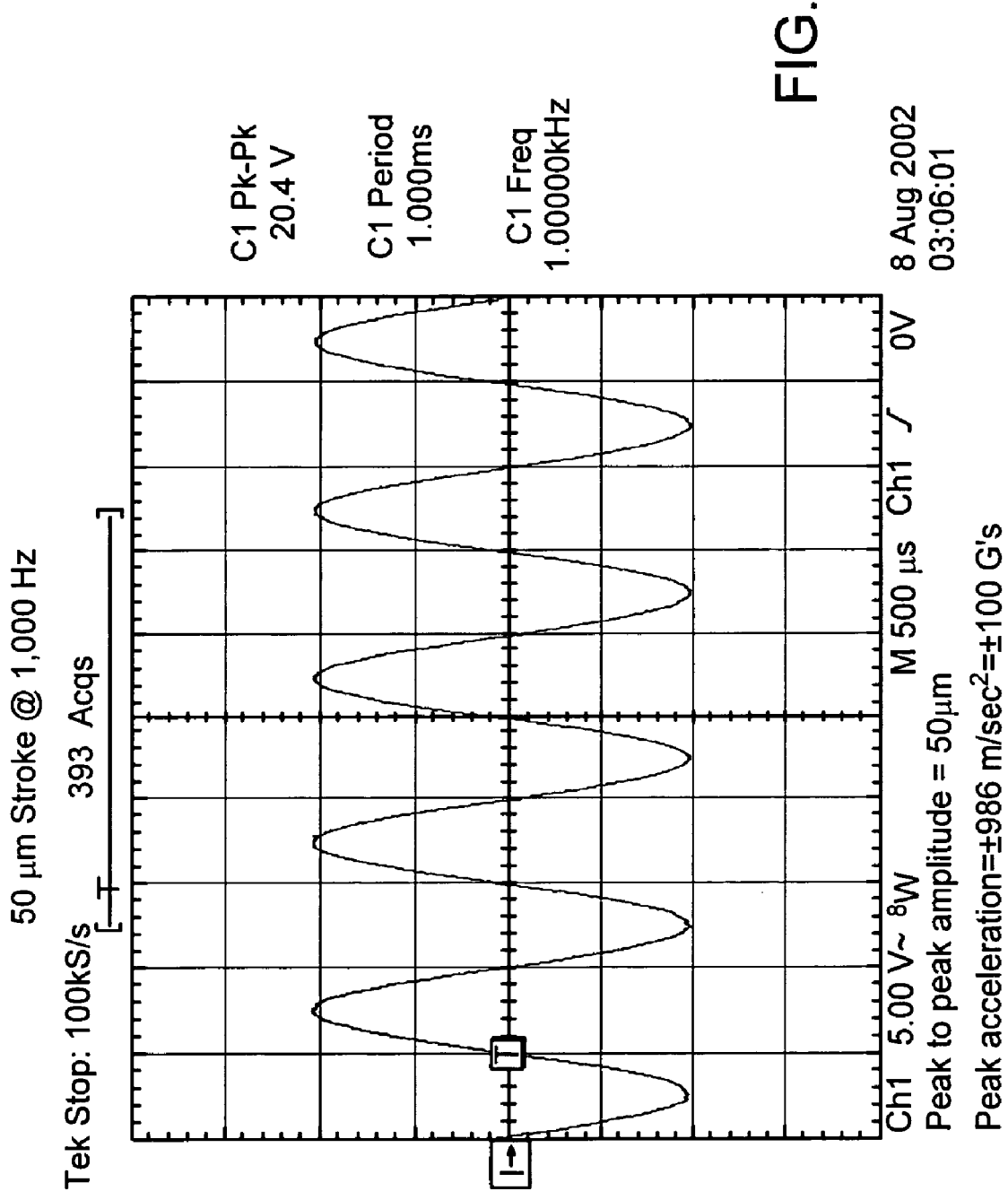
FIG. 19E illustrates the full stroke of 50 μm that is achieved at 1 kHz operation of a fast tool servo in accordance with a preferred embodiment of the present invention.

FIG. 19D illustrates the acceleration of the fast tool servo when tracking a 9 μm peak-to-valley 3 kHz sine wave in accordance with a preferred embodiment of the present invention. FIG. 19E illustrates the full stroke of 50 µm that is achieved at 1 kHz operation of a fast tool servo in accordance with a preferred embodiment of the present invention.

Figure 19F:
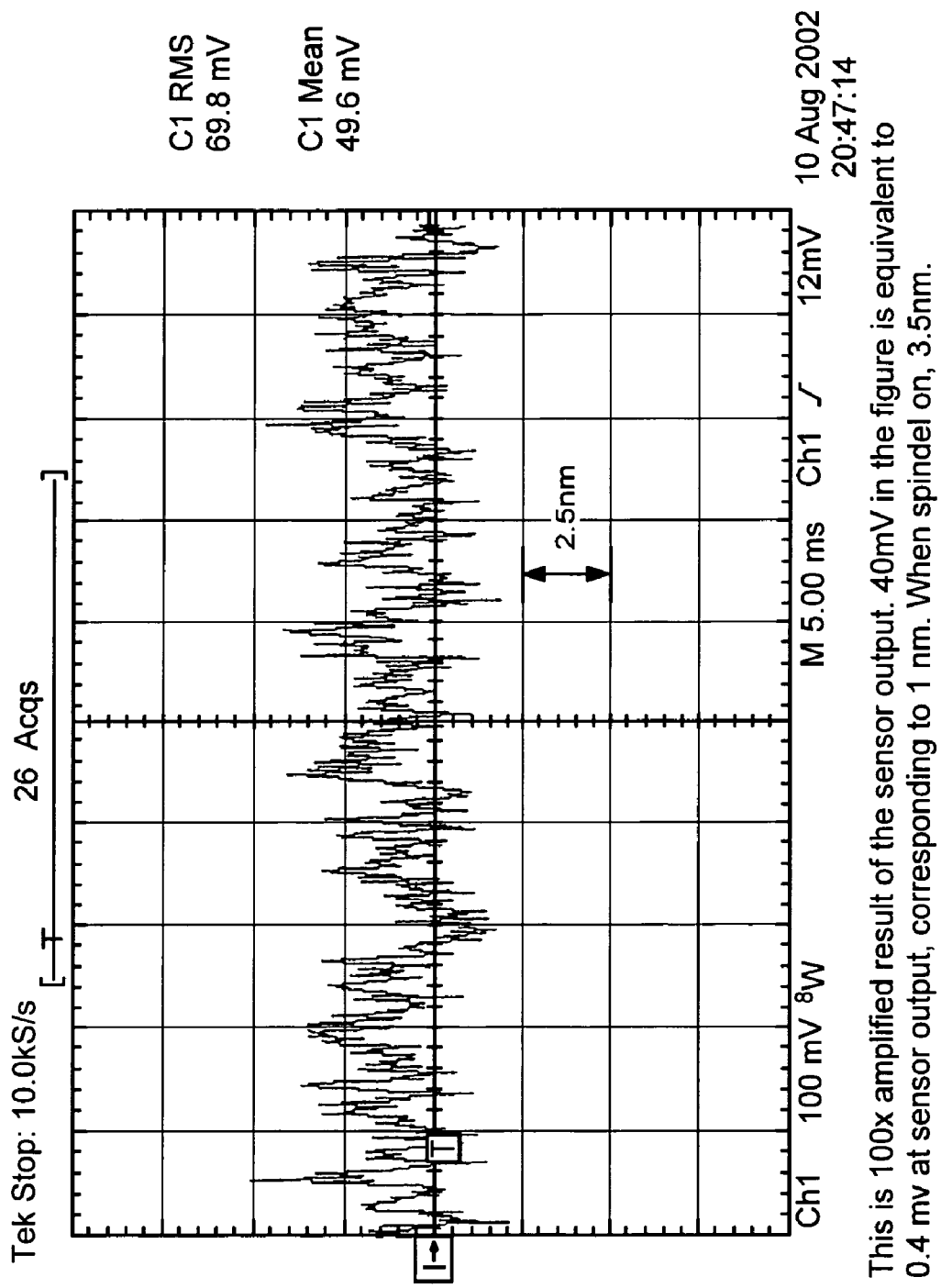
FIG. 19F illustrates graphically a 1.2 nm RMS error when the spindle is off in accordance with a preferred embodiment of the present invention.
Figure 19G:
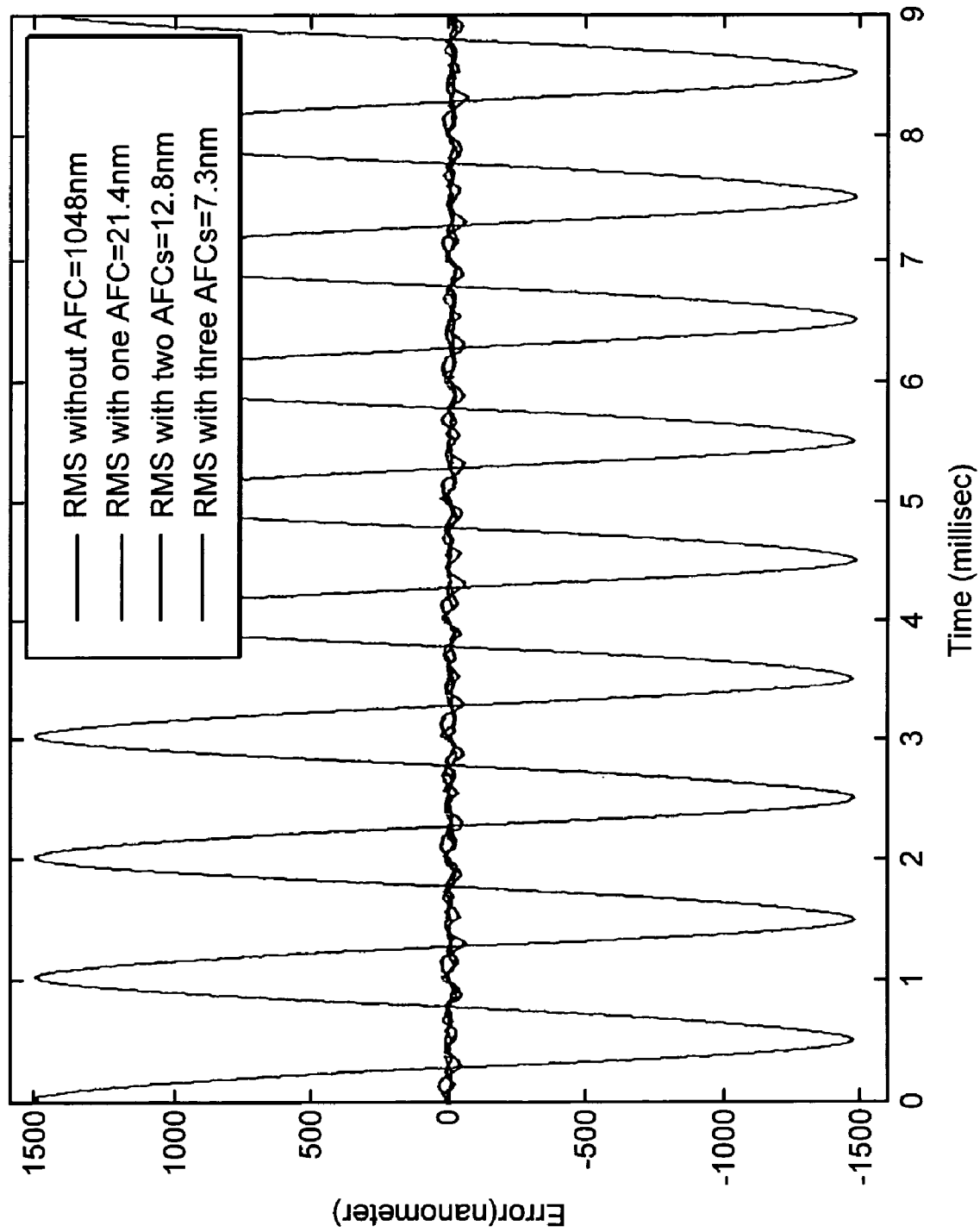
FIG. 19G graphically illustrates the error in tracking a 10 μm, 1 kHz sinusoidal signal in accordance with a preferred embodiment of the present invention.

FIG. 19F illustrates graphically a 1.2 nm RMS error when the spindle is off in accordance with a preferred embodiment of the present invention. FIG. 19G graphically illustrates the error in tracking a 10 µm, 1 kHz sinusoidal signal in accordance with a preferred embodiment of the present invention.

FIG. 20 illustrates a diamond turned part provided by a preferred embodiment of an electromagnetically driven FTS. The surface is machined by face turning. The cutting is conducted using a Moore diamond turning machine. A DSPACE 1103 board controls both the X-Z slides of the machine and the FTS as described with respect to one preferred embodiment. A multiple sampling rate system is implemented. The sampling rate for the FTS controller is 83 kHz and the sampling rate for the spindle and X-Z slides controller is 4 kHz to ensure that the slides controls achieve 100 Hz bandwidth. The spindle speed is approximately 1800 rpm.

Figure 20A:
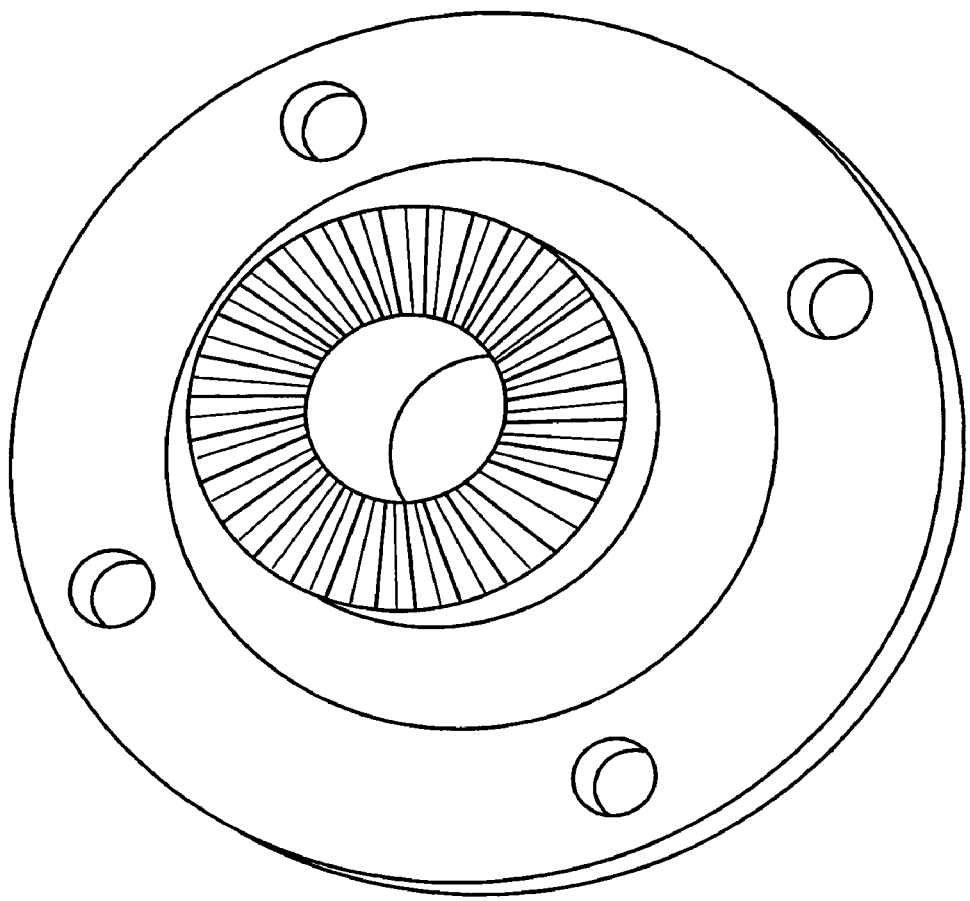
FIG. 20A illustrates a diamond turned part provided by the electromagnetically driven FTS in accordance with a preferred embodiment of the present invention.
Figure 20B:
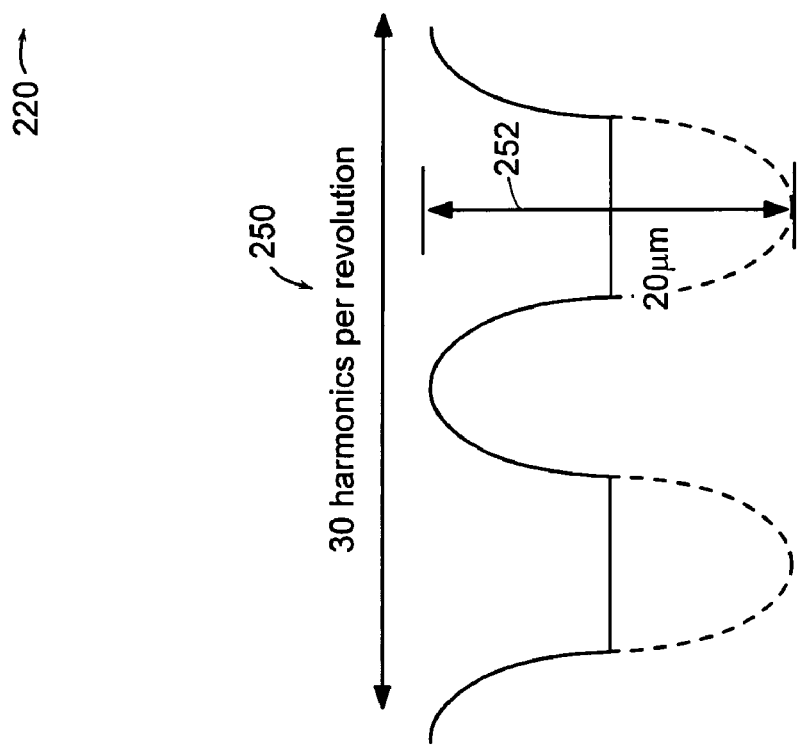
FIG. 20B graphically illustrates a profile, expanded in the circumference, to show a half sinusoidal wave of the diamond turned part illustrated in FIG. 20A wherein the peak-to-valley amplitude of the sine wave is 20 μm in accordance with a preferred embodiment of the present invention.

FIG. 20B illustrates the profile, expanded in the circumference to be a half sinusoidal wave. There are 30 harmonics per spindle revolution and the peak-to-valley amplitude of the sine wave is 20 µm. The flat surface (a piece of aluminum material) was machined first and then the sinusoidal surface was cut.

Figure 20C:
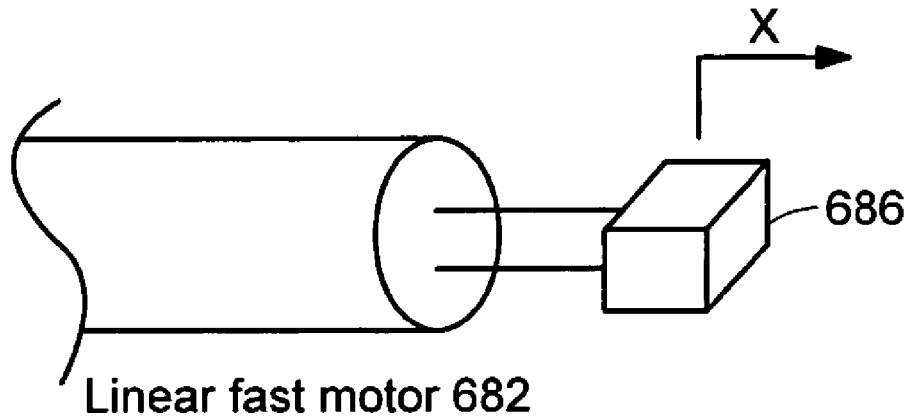
FIGS. 20C-20H illustrate preferred embodiments of positioning systems in accordance with the invention.
Figure 20D:
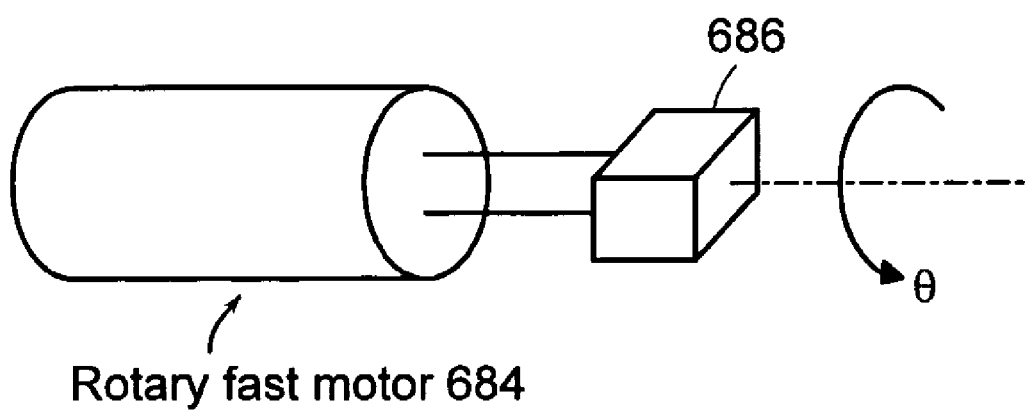

FIGS. 20C and 20D illustrate micro-positioning systems 680. A linear fast motor 682 as described herein is used to position article 686 along a longitudinal (X) axis. Alternatively, a rotary fast motor 684 is used to rotate article 686 around axis through angle θ.

Figure 20E:
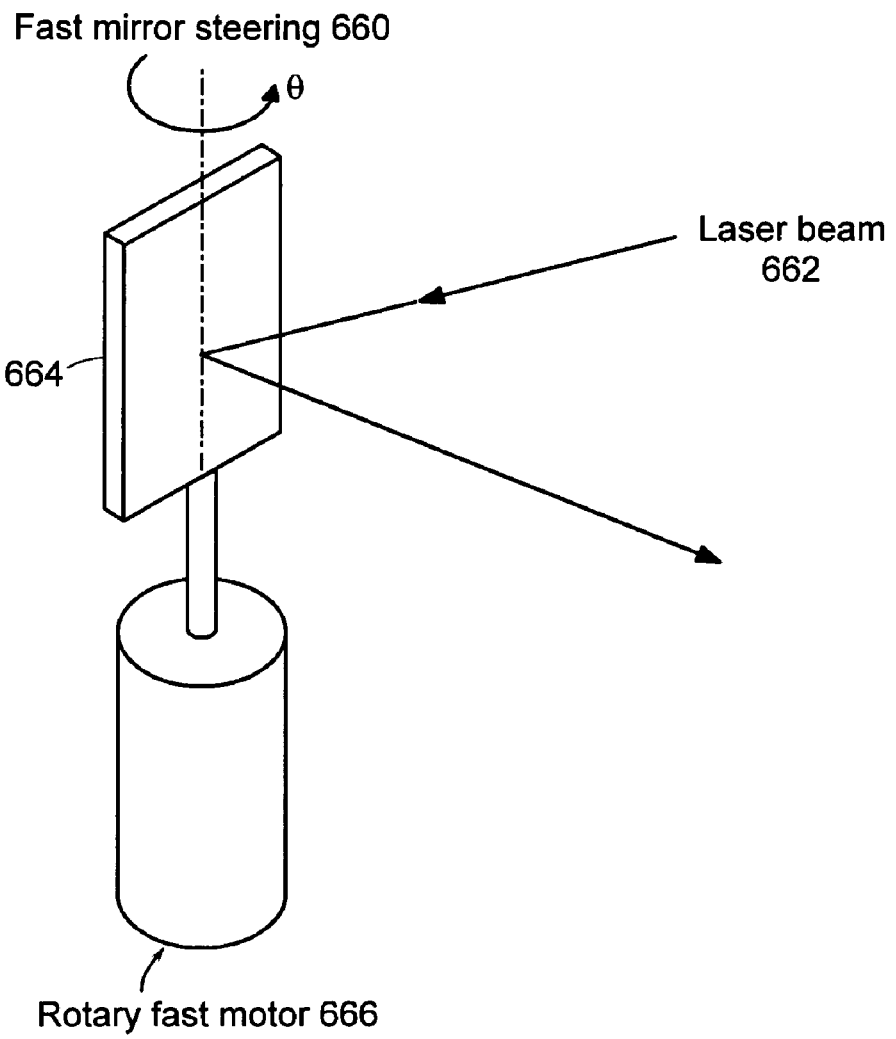
Figure 20F:
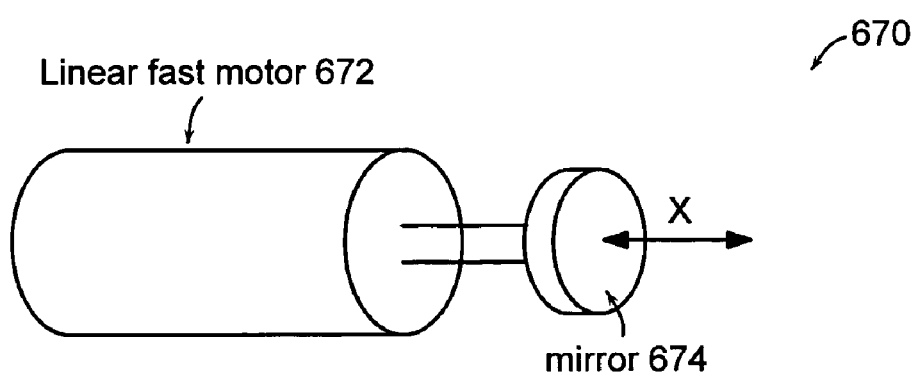

As shown in FIGS. 20E and 20F, fast mirror steering 660 can be obtained using a rotary fast motor 666 as described herein to position mirror 664 to reflect light from a lamp or laser 662 along a path. Alternatively, a linear fast motor 672 can position mirror 674 along an axis.

Figure 20G:
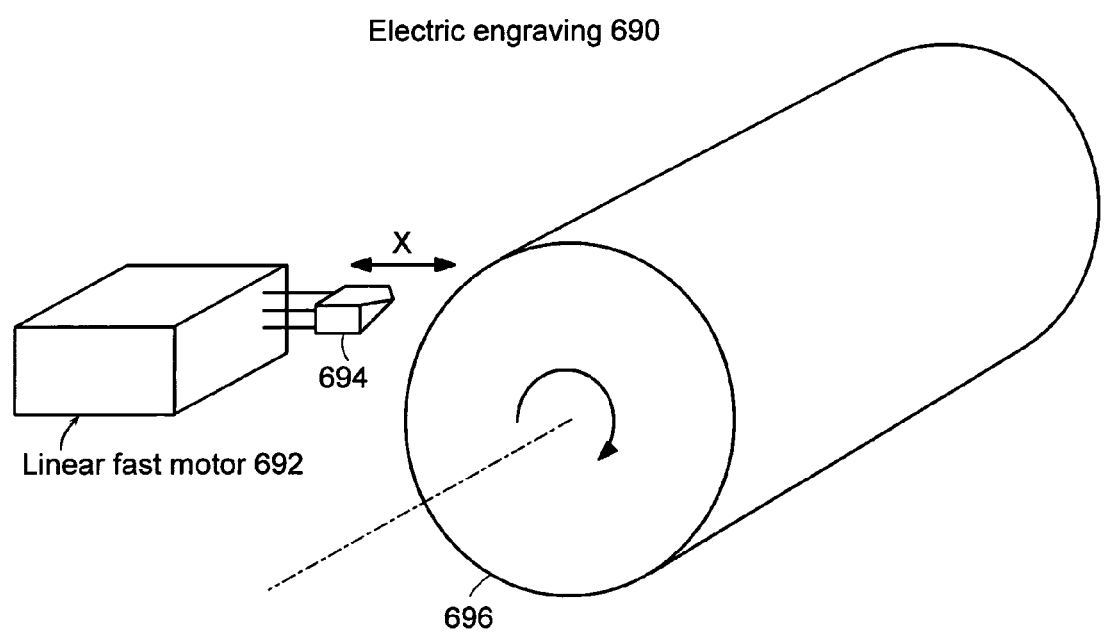
Figure 20H:
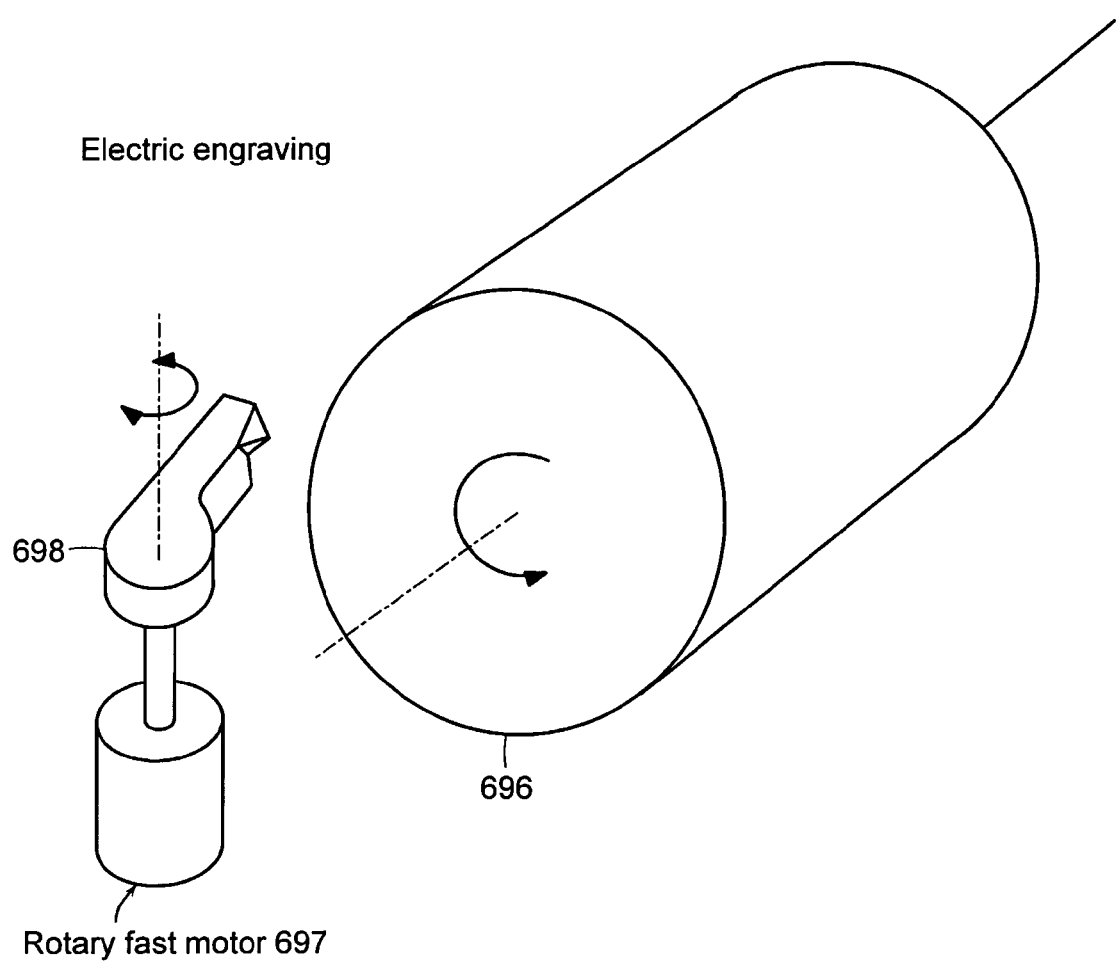

As shown in FIGS. 20G and 20H, an engraver 690 can include a rotating drum 696 positioned relative to a linear motor 692 and tool 694 or rotary motor 697 and tool 698.

The claims should not be read as limited to the described order or elements unless stated to that effect. Therefore, all embodiments that come within the scope and spirit of the following claims and equivalents thereto are claimed as the invention.

What is claimed:

1. A device for positioning an article, the device comprising:
   a frame;
   an armature moveably positioned within the frame, the armature having an electromagnetic biasing surface and a working surface such that a drive force is applied to the working surface and a bias is applied to the biasing surface, wherein the armature further comprises a shaft coupled to a cutting tool at a distal end, the cutting tool being mounted to an armature element at a proximal end of the shaft;
   a permanent magnet that applies bias to the biasing surface;
   an electromagnetic actuator that applies a force to the working surface to actuate movement of the armature;
   an article mounted to the armature, the device operating to position the article;
   an armature position sensor for sensing position of the armature;
   a flexure that guides the article along an axis, wherein the axis corresponds to one degree-of-freedom; and
   a solenoid pair for actuating the armature, wherein the solenoids are shaped for receiving a winding, respectively, and wherein the windings are driven using a linear power amplifier.

2. A device for positioning an article, the device comprising:
   a frame;
   an armature moveably positioned within the frame, the armature having an electromagnetic biasing surface and a working surface such that a drive force is applied to the working surface and a bias is applied to the biasing surface;
   a permanent magnet that applies bias to the biasing surface;
   an electromagnetic actuator that applies a force to the working surface to actuate movement of the armature;
   an article mounted to the armature, the device operating to position the article;
   an armature position sensor for sensing position of the armature; and
   a flexure that guides the article along an axis,
   wherein the position sensor establishes a position of a cutting tool with respect to a work piece, and
   wherein the position sensor is a capacitance probe capable of monitoring the position of the cutting tool when the tool has acceleration on the order of 1,000 G or more.

3. The device of claim 2, wherein the capacitance probe maintains a resolution on the order of 1 nanometer (nm) RMS.

4. A device for positioning an article, the device comprising:
   a frame;
   an armature moveably positioned within the frame, the armature having an electromagnetic biasing surface and a working surface such that a drive force is applied to the working surface and a bias is applied to the biasing surface, wherein the armature further comprises a shaft coupled to a cutting tool at a distal end, the cutting tool being mounted to an armature element at a proximal end of the shaft;
   a permanent magnet that applies bias to the biasing surface;
   an electromagnetic actuator that applies a force to the working surface to actuate movement of the armature;
   an article mounted to the armature, the device operating to position the article;
   an armature position sensor for sensing position of the armature;
   a flexure that guides the article along an axis, wherein the axis corresponds to one degree-of-freedom;
   a solenoid pair for actuating the armature, wherein the armature and solenoids are made of high frequency, soft magnetic materials, wherein the soft magnetic materials are selected from the group having members consisting of ferrite, silicon steel lamination, nickel-steel, cobalt-steel, powder sintered iron, and metallic glass; and
   a controller for controlling operation of the device, wherein the controller comprises at least one of a dynamic non-linear compensator, an adaptive-feed forward compensator and a frequency shaping compensator.

5. A device for positioning an article, the device comprising:
   a frame;
   an armature moveably positioned within the frame, the armature having an electromagnetic biasing surface and a working surface such that a drive force is applied to the working surface and a bias is applied to the biasing surface, wherein the armature further comprises a shaft coupled to a cutting tool at a distal end, the cutting tool being mounted to an armature element at a proximal end of the shaft;

a permanent magnet that applies bias to the biasing surface;

an electromagnetic actuator that applies a force to the working surface to actuate movement of the armature;

an article mounted to the armature, the device operating to position the article;

an armature position sensor for sensing position of the armature;

a flexure that guides the article along an axis, wherein the axis corresponds to one degree-of-freedom;

a solenoid pair for actuating the armature, wherein the armature and solenoids are made of high frequency, soft magnetic materials, wherein the soft magnetic materials are selected from the group having members consisting of ferrite, silicon steel lamination, nickel-steel, cobalt-steel, powder sintered iron, and metallic glass; and a controller for controlling operation of the device, wherein the controller includes at least one digital signal processor.

6. A device for positioning an article, the device comprising:

a frame;

an armature moveably positioned within the frame, the armature having an electromagnetic biasing surface and a working surface such that a drive force is applied to the working surface and a bias is applied to the biasing surface, wherein the armature further comprises a shaft coupled to a cutting tool at a distal end, the cutting tool being mounted to an armature element at a proximal end of the shaft;

a permanent magnet that applies bias to the biasing surface;

an electromagnetic actuator that applies a force to the working surface to actuate movement of the armature;

an article mounted to the armature, the device operating to position the article;

an armature position sensor for sensing position of the armature;

a flexure that guides the article along an axis, wherein the axis corresponds to one degree-of-freedom;

a solenoid pair for actuating the armature, wherein the armature and solenoids are made of high frequency, soft magnetic materials, wherein the soft magnetic materials are selected from the group having members consisting of ferrite, silicon steel lamination, nickel-steel, cobalt-steel, powder sintered iron, and metallic glass; and a controller for controlling operation of the device, wherein the controller includes a graphical user interface.

7. A device for positioning an article, the device comprising:

a frame;

an armature moveably positioned within the frame, the armature having an electromagnetic biasing surface and a working surface such that a drive force is applied to the working surface and a bias is applied to the biasing surface;

a permanent magnet that applies bias to the biasing surface;

an electromagnetic actuator that applies a force to the working surface to actuate movement of the armature;

an article mounted to the armature, the device operating to position the article;

an armature position sensor for sensing position of the armature; and a flexure that guides the article along an axis, wherein the position sensor establishes a position of a cutting tool with respect to a work piece, and wherein the work piece rotates about the axis while engaged by the cutting tool.

8. A device for positioning an article, the device comprising:

a frame;

an armature moveably positioned within the frame, the armature having an electromagnetic biasing surface and a working surface such that a drive force is applied to the working surface and a bias is applied to the biasing surface;

a permanent magnet that applies bias to the biasing surface;

an electromagnetic actuator that applies a force to the working surface to actuate movement of the armature;

an article mounted to the armature, the device operating to position the article;

an armature position sensor for sensing position of the armature, wherein the armature further comprises a shaft coupled to a cutting tool at a distal end, the cutting tool being mounted to an armature element at a proximal end of the shaft;

a flexure that guides the article along an axis, wherein the axis corresponds to one degree-of-freedom; and a solenoid pair for actuating the armature, wherein the solenoids are shaped for receiving a winding, respectively, and wherein the windings are driven using a switching amplifier.

9. A device for positioning an article, the device comprising:

a frame;

an armature moveably positioned within the frame, the armature having an electromagnetic biasing surface and a working surface such that a drive force is applied to the working surface and a bias is applied to the biasing surface;

a permanent magnet that applies bias to the biasing surface;

an electromagnetic actuator that applies a force to the working surface to actuate movement of the armature;

an article mounted to the armature, the device operating to position the article;

an armature position sensor for sensing position of the armature;

a flux sensing coil, wherein the flux sensing coil and the armature position sensor generate signals added to a current feedback signal; and a low pass filter that filters the signals.

* * * * *

UNITED STATES PATENT AND TRADEMARK OFFICE
CERTIFICATE OF CORRECTION

| | | |
|---|---|---|
| PATENT NO. | : 7,616,084 B2 | Page 1 of 1 |
| APPLICATION NO. | : 10/977122 | |
| DATED | : November 10, 2009 | |
| INVENTOR(S) | : Lu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 310 days.

Signed and Sealed this

Nineteenth Day of October, 2010

David J. Kappos
*Director of the United States Patent and Trademark Office*